United States Patent
Watanabe et al.

(10) Patent No.: US 10,798,614 B2
(45) Date of Patent: Oct. 6, 2020

(54) COMMUNICATION NETWORK APPARATUS, COMMUNICATION NETWORK SYSTEM, AND METHOD OF COMMUNICATION NETWORK APPARATUS

(71) Applicant: NEC CORPORATION, Tokyo (JP)

(72) Inventors: Yoshinori Watanabe, Tokyo (JP); Tomoaki Hokao, Tokyo (JP); Kenki Takagi, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 108 days.

(21) Appl. No.: 16/310,665

(22) PCT Filed: Mar. 16, 2017

(86) PCT No.: PCT/JP2017/010677
§ 371 (c)(1),
(2) Date: Dec. 17, 2018

(87) PCT Pub. No.: WO2017/221481
PCT Pub. Date: Dec. 28, 2017

(65) Prior Publication Data
US 2019/0182712 A1 Jun. 13, 2019

(30) Foreign Application Priority Data
Jun. 20, 2016 (JP) .................. 2016-121909

(51) Int. Cl.
*H04W 28/12* (2009.01)
*H04W 92/14* (2009.01)
(Continued)

(52) U.S. Cl.
CPC ............. *H04W 28/12* (2013.01); *H04L 47/14* (2013.01); *H04L 47/22* (2013.01); *H04L 47/762* (2013.01);
(Continued)

(58) Field of Classification Search
None
See application file for complete search history.

(56) References Cited

U.S. PATENT DOCUMENTS 8,385,199 B1 * 2/2013 Coward .................. H04L 47/22
370/230.1
2002/0160811 A1 10/2002 Jannette et al.
(Continued)

FOREIGN PATENT DOCUMENTS

| EP | 2 375 658 A1 | 10/2011 |
| JP | 2008-067020 A | 3/2008 |

(Continued)

OTHER PUBLICATIONS

Communication dated Mar. 3, 2020, from the European Patent Office in Application No. 17814953.0.
(Continued)

*Primary Examiner* — Otis L Thompson, Jr.
(74) *Attorney, Agent, or Firm* — Sughrue Mion, PLLC

(57) ABSTRACT

A traffic controller (8) receives, from a traffic monitor (7), a first control message generated in response to an increase in a total transmission rate of a plurality of packet flows sent from a plurality of wireless terminals (1) to a specific external network. The controller (8) determines, based on an evaluation criterion received from a criteria manager (6), one or more packet flows on which traffic shaping is to be imposed. In response to the first control message, the controller (8) controls a base station within a RAN (2) or a packet transfer node within a mobile backhaul (30) to execute the traffic shaping. This, for example, contribute to adjusting traffic that passes through a cellular communication network based on a monitoring result of a total transmission rate of traffic sent from the cellular communication network to the external network.

20 Claims, 12 Drawing Sheets

(51) Int. Cl.
*H04L 12/815* (2013.01)
*H04L 12/801* (2013.01)
*H04L 12/923* (2013.01)
*H04L 12/927* (2013.01)
*H04W 24/08* (2009.01)
*H04W 28/22* (2009.01)

(52) U.S. Cl.
CPC .......... *H04L 47/805* (2013.01); *H04W 24/08* (2013.01); *H04W 28/22* (2013.01); *H04W 92/14* (2013.01)

(56) References Cited

U.S. PATENT DOCUMENTS

| | | | |
|---|---|---|---|
| 2003/0039233 A1* | 2/2003 | Satt | H04L 47/30 370/338 |
| 2010/0188975 A1* | 7/2010 | Raleigh | G06Q 30/04 370/230.1 |
| 2012/0002620 A1 | 1/2012 | Kokku et al. | |
| 2013/0051226 A1* | 2/2013 | Elefant | H04W 28/0289 370/230 |
| 2013/0064080 A1 | 3/2013 | Kemmerer et al. | |
| 2013/0100807 A1* | 4/2013 | Bhanage | H04L 12/1439 370/232 |
| 2013/0170348 A1* | 7/2013 | Luna | H04W 28/06 370/230.1 |
| 2013/0188480 A1* | 7/2013 | Hahn | H04W 28/02 370/229 |
| 2014/0128026 A1* | 5/2014 | Raleigh | H04M 15/58 455/406 |
| 2015/0332145 A1* | 11/2015 | Vasseur | H04L 43/0876 706/12 |
| 2015/0363244 A1* | 12/2015 | Bott | H04L 69/162 719/328 |
| 2016/0381693 A1* | 12/2016 | Sanda | H04L 47/2433 370/329 |
| 2017/0078922 A1* | 3/2017 | Raleigh | H04W 28/10 |
| 2017/0359749 A1* | 12/2017 | Dao | H04W 28/0268 |
| 2018/0234297 A1* | 8/2018 | Wang | H04L 41/0893 |
| 2018/0351897 A1* | 12/2018 | Istrati | H04W 4/14 |
| 2019/0140966 A1* | 5/2019 | Geffen | H04L 47/34 |

FOREIGN PATENT DOCUMENTS

| | | |
|---|---|---|
| JP | 2012-178662 A | 9/2012 |
| WO | 2015/056392 A1 | 4/2015 |
| WO | 2016/025174 A1 | 2/2016 |

OTHER PUBLICATIONS

Communication dated Apr. 8, 2019, from the European Patent Office in counterpart European Application No. 17814953.0.

Kirti Keshav, et al., "A Dynamic Bandwidth Allocation Scheme for Interactive Multimedia Applications over Cellular Networks", ICN 2011: The Tenth International Conference on Networks, 2011, pp. 273-278 (6 pages total).

International Search Report for PCT/JP2017/010677 dated Jun. 6, 2017 [PCT/ISA/210].

Notice of Reasons for Refusal dated Sep. 10, 2019 from the Japanese Patent Office in application No. 2018-523322.

* cited by examiner

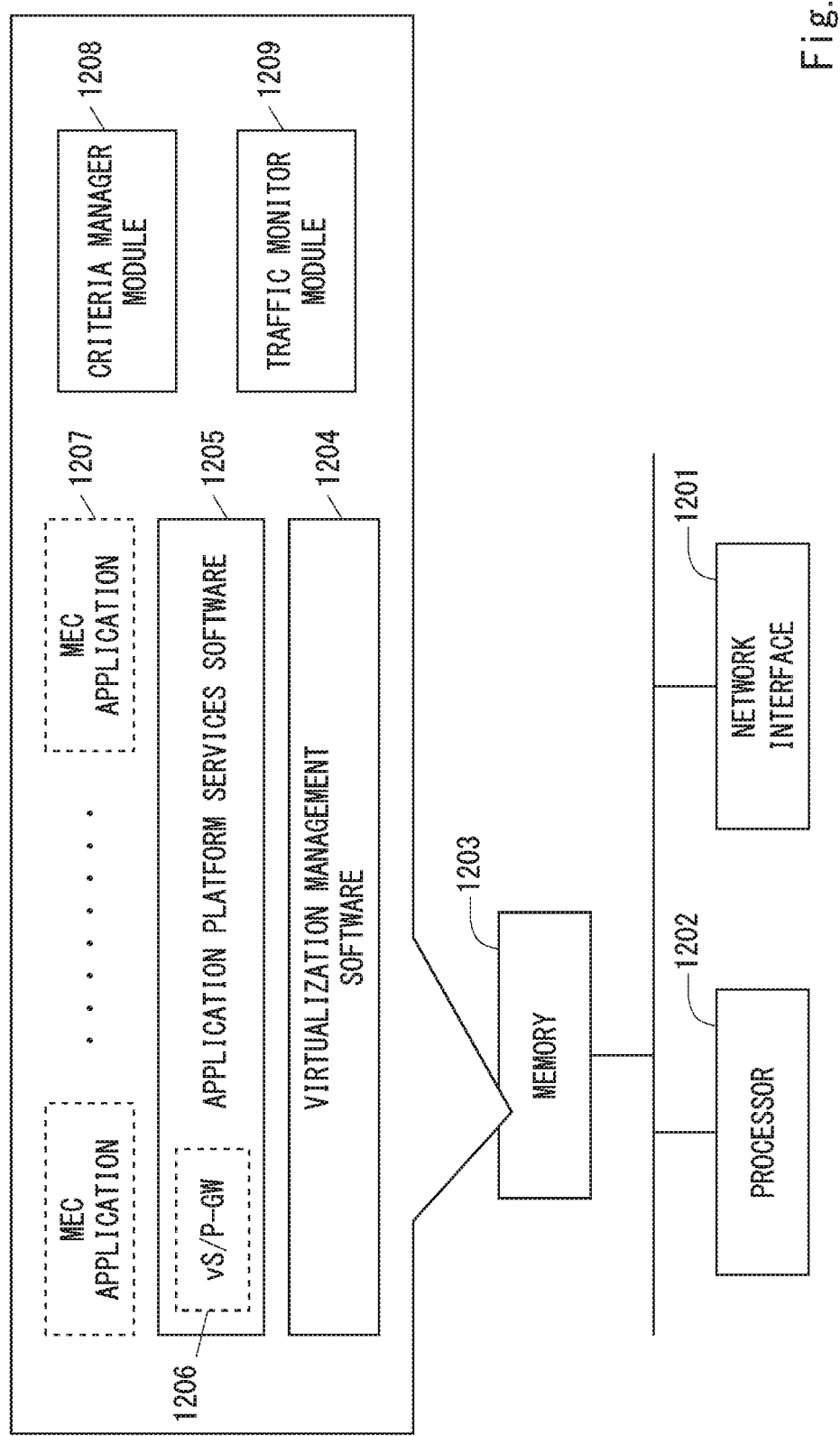

COMMUNICATION NETWORK APPARATUS, COMMUNICATION NETWORK SYSTEM, AND METHOD OF COMMUNICATION NETWORK APPARATUS

CROSS REFERENCE TO RELATED APPLICATIONS

This application is a National Stage of International Application No. PCT/JP2017/010677, filed on Mar. 16, 2017, which claims priority from Japanese Patent Application No. 2016-121909, filed on Jun. 20, 2016, the disclosure of which is incorporated herein in its entirety by reference.

TECHNICAL FIELD

The present disclosure relates to a communication system and, in particular, to traffic shaping in a radio access network or in a mobile backhaul.

BACKGROUND ART

Patent Literature 1 discloses a monitoring system for disaster prevention. In the monitoring system, moving camera devices are connected to a disaster prevention center system via wireless lines including a wireless relay device and transmit video data (video information) to the disaster prevention center system via these wireless lines. The disaster prevention center system is configured to evaluate a priority of each moving camera device and adjust a radio bandwidth between each moving camera device and the disaster prevention center system based on the priority. More specifically, the disaster prevention center system updates wireless communication settings of the disaster prevention center system, the wireless relay device and the moving camera devices to increase the radio bandwidth between the disaster prevention center system and a first moving camera device having a higher priority than a second moving camera device, compared to that between the disaster prevention center system and the second moving camera device.

CITATION LIST

Patent Literature

Japanese Unexamined Patent Application Publication No. 2012-178662

SUMMARY OF INVENTION

Technical Problem

The inventors have studied a case where a communication bandwidth (or a transmission rate) of a cellular communication network available for an application server to receive data from wireless terminals via the cellular communication network is restricted by a predetermined upper limit value.

The cellular communication network includes a Radio Access Network (RAN) and a Core Network (CN). The RAN is, for example, a UMTS Terrestrial Radio Access Network (UTRAN) or an Evolved UTRAN (E-UTRAN). The core network is, for example, a UMTS core network or an Evolved Packet core (EPC). The RAN includes a base station connected to wireless terminal by a radio access technology. The base station is, for example, a combination of a NodeB and a Radio Network Controller (RNC) in the UTRAN, or an eNodeB (eNB) in the E-UTRAN. The core network is accessed by wireless terminals through the RAN and provides these wireless terminals with connection services to an external network (e.g., Internet Protocol (IP) connection service).

In this specification, the cellular communication network may further include a Mobile Backhaul (MBH). The mobile backhaul is a network which connects sites (i.e., cell sites) in which base stations are disposed (e.g., NodeBs, RNCs, or eNBs) to a site on which a higher network apparatus (e.g., an RNC, a Serving GPRS Support Node (SGSN), a Serving Gateway (SGW), or a Mobility Management Entity (MME)) is disposed. To provide IP packet transfer services between base stations and the higher network apparatus, the mobile backhaul includes a physical-layer (i.e., layer-1) network and a packet transport network which transfers IP packets on the physical-layer network. The physical-layer network consists of optical fibers (e.g., a Passive Optical Network (PON), a Synchronous Optical Network (SONET)/Synchronous Digital Hierarchy (SDH), and Wavelength Division Multiplexing (WDM)), copper wires (e.g., E1/T1 network and Digital Subscriber Lines (DSLs)), or radio links (e.g., microwave point-to-point links), or any combination thereof. The packet transport network uses, for example, a Virtual Local Area Network (VLAN) technique, or a Multi-Protocol Label Switching (MPLS) technique, or a combination thereof.

In one example, the upper limit value of the transmission rate in the cellular communication network may be determined based on the network capacity of a Mobile Network Operator (MNO). In another example, the upper limit value of the transmission rate in the cellular communication network may be determined based on an agreement between the MNO and a Mobile Virtual Network Operator (MVNO). The MVNO provides communication service for wireless terminals via the CN and the RAN of the MNO. The boundary of an MVNO network and an MNO network is referred to as a point of interconnection (POI) or a point of interface (POI).

Wireless terminals may be terminals having mobility or stationary terminals having no mobility. Wireless terminals may be Internet of Things (IoT) devices. IoT devices having cellular communication functions are also referred to as Cellular IoT (CIoT) devices, Machine Type Communication (MTC) devices, or Machine to Machine (M2M) devices. IoT devices are, for example, terminals which perform communication without human intervention. IoT devices are placed in various types of equipment including machines (e.g., vending machines, gas meters, electric meters, cars, railway vehicles, and ships) and sensors (e.g., environmental, agricultural, and traffic sensors).

In some implementations, a static upper limit value may be set to a data transmission rate of each wireless terminal to keep the upper limit value of the transmission rate in the cellular communication network available for the application server. However, these implementations cannot sufficiently or efficiently use the capacity of the core network or the upper limit value based on the agreement. This is because all wireless terminals do not necessarily simultaneously communicate with the application server. It is preferable that, as long as the total transmission rate of wireless terminals which simultaneously perform communication does not exceed the upper limit value, these wireless terminals and the application server able to use as high a transmission rate as possible.

In addition, wireless terminals could have different priorities. Furthermore, the priority of each terminal could vary dynamically. For example, in a case where wireless terminals are placed in environmental, agricultural, or traffic sensors, when a specific event (e.g., a traffic jam, a traffic accident, heavy rain or a natural disaster) occurs, a wireless terminal located in or near an area in which this specific event occurs may be assigned a higher priority than other wireless terminals. It is preferable that, when the total transmission rate of wireless terminals is adjusted in order to keep the upper limit value of the transmission rate in the cellular communication network available for the application server, the transmission rate of a wireless terminal having a higher priority is more preferentially secured than those of other wireless terminals having a lower priority.

As described above, Patent Literature 1 discloses updating the wireless communication settings of the disaster prevention center system, the wireless relay device and the wireless terminals (i.e., moving camera devices) to increase the radio bandwidth between the disaster prevention center system and a wireless terminal having a higher priority than another wireless terminal, compared to that between the disaster prevention center system and the other wireless terminal. However, Patent Literature 1 does not disclose traffic shaping for adjusting the transmission rate in the cellular communication network. In addition, Patent Literature 1 does not disclose a functional arrangement for traffic shaping which is suitable to the cellular communication network.

As described above, in one example, the upper limit value of the transmission rate in the cellular communication network is determined based on the agreement between the MNO and the MVNO. In this case, the upper limit value of the transmission rate is generally imposed on the total transmission rate of a plurality of packet flows sent through the POI from a plurality of wireless terminals to the MVNO network. However, even if traffic shaping is performed at the POI, it is difficult to reduce traffic that passes through the core network of the MNO and is related to the MVNO. Thus, there is a need for traffic shaping suitable for a cellular communication network to enable adjustment of traffic that passes through the cellular communication network based on a monitoring result of the total transmission rate of traffic sent from the cellular communication network to the external network.

One of the objects to be attained by embodiments disclosed herein is to provide an apparatus, a method, and a program that contribute to adjusting traffic that passes through a cellular communication network based on a monitoring result of a total transmission rate of traffic sent from the cellular communication network to an external network. It should be noted that the above-described object is merely one of the objects to be attained by the embodiments disclosed herein. Other objects or problems and novel features will be made apparent from the following description and the accompanying drawings.

Solution to Problem

In a first aspect, a traffic controller includes at least one memory and at least one processor coupled to the at least one memory. The at least one processor is configured to receive, from a traffic monitor, a first control message generated in response to an increase in a total transmission rate of a plurality of packet flows sent through a cellular communication network of a mobile network operator (MNO) from a plurality of wireless terminals to a specific external network. The cellular communication network includes a radio access network (RAN), a core network, and a mobile backhaul configured to connect the RAN to the core network. The at least one processor is further configured to receive, from a criteria manager, an evaluation criterion for deciding a priority of each packet flow transmitted by at least one wireless terminal. The at least one processor is further configured to determine, based on the evaluation criterion, one or more packet flows on which traffic shaping is to be imposed. The at least one processor is further configured to, in response to the first control message, control a base station within the RAN or a packet transfer node within the mobile backhaul to execute the traffic shaping.

In a second aspect, a traffic monitor includes at least one memory and at least one processor coupled to the at least one memory. The at least one processor is configured to: generate a first control message in response to an increase in a total transmission rate of a plurality of packet flows sent through a cellular communication network of a mobile network operator (MNO) from a plurality of wireless terminals to a specific external network; and transmit the first control message to a traffic controller. The cellular communication network includes a radio access network (RAN), a core network, a core network and a mobile backhaul configured to connect the RAN and the core network. The first control message triggers the traffic controller to execute traffic shaping at a base station within the RAN or at a packet transfer node within the mobile backhaul.

In a third aspect, a criteria manager includes at least one memory and at least one processor coupled to the at least one memory. The at least one processor is configured to transmit, to a traffic controller, an evaluation criterion for deciding a priority of each packet flow transmitted by at least one wireless terminal. The evaluation criterion is used by the traffic controller to determine one or more packet flows on which traffic shaping at a base station within a radio access network (RAN) or at a packet transfer node within a mobile backhaul is to be imposed.

In a fourth aspect, a system includes a traffic controller according to the first aspect, a traffic monitor according to the second aspect, and a criteria manager according to the third aspect.

In a fifth aspect, a method performed by a traffic controller includes:

(a) receiving, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;

(b) receiving, from a criteria manager, an evaluation criterion for deciding a priority of each packet flow transmitted by at least one wireless terminal;

(c) determining, based on the evaluation criterion, one or more packet flows on which traffic shaping is to be imposed; and (d) in response to the first control message, controlling a base station within the RAN or a packet transfer node within the mobile backhaul to execute the traffic shaping.

In a sixth aspect, a method performed by a traffic manager includes: (a) generating a first control message in response to an increase in a total transmission rate of a plurality of packet flows sent through a cellular communication network of a mobile network operator (MNO) from a plurality of wireless terminals to a specific external network; and (b) transmitting the first control message to a traffic controller.

The cellular communication network includes a radio access network (RAN), a core network, a core network and a mobile backhaul configured to connect the RAN and the core network. The first control message triggers the traffic controller to execute traffic shaping at a base station within the RAN or at a packet transfer node within the mobile backhaul.

In a seventh aspect, a method performed by a criteria manager comprises transmitting, to a traffic controller, an evaluation criterion for deciding a priority of each packet flow transmitted by at least one wireless terminal. The evaluation criterion is used by the traffic controller to determine one or more packet flows on which traffic shaping at a base station within a radio access network (RAN) or at a packet transfer node within a mobile backhaul is to be imposed.

In an eighth aspect, a program includes a set of instructions (software codes) that, when loaded into a computer, causes the computer to perform a method according to the above-described fifth, sixth, or seventh aspect.

Advantageous Effects of Invention

According to the above embodiments, it is possible to provide an apparatus, a method, and a program that contribute to adjusting traffic that passes through a cellular communication network based on a monitoring result of a total transmission rate of traffic sent from the cellular communication network to an external network.

BRIEF DESCRIPTION OF DRAWINGS

FIG. 12 is a block diagram showing a configuration example of a MEC server according to some embodiments.

DESCRIPTION OF EMBODIMENTS

Specific embodiments will be described hereinafter in detail with reference to the drawings. The same or corresponding elements are denoted by the same symbols throughout the drawings, and duplicated explanations are omitted as necessary for the sake of clarity.

First Embodiment

Figure 1:
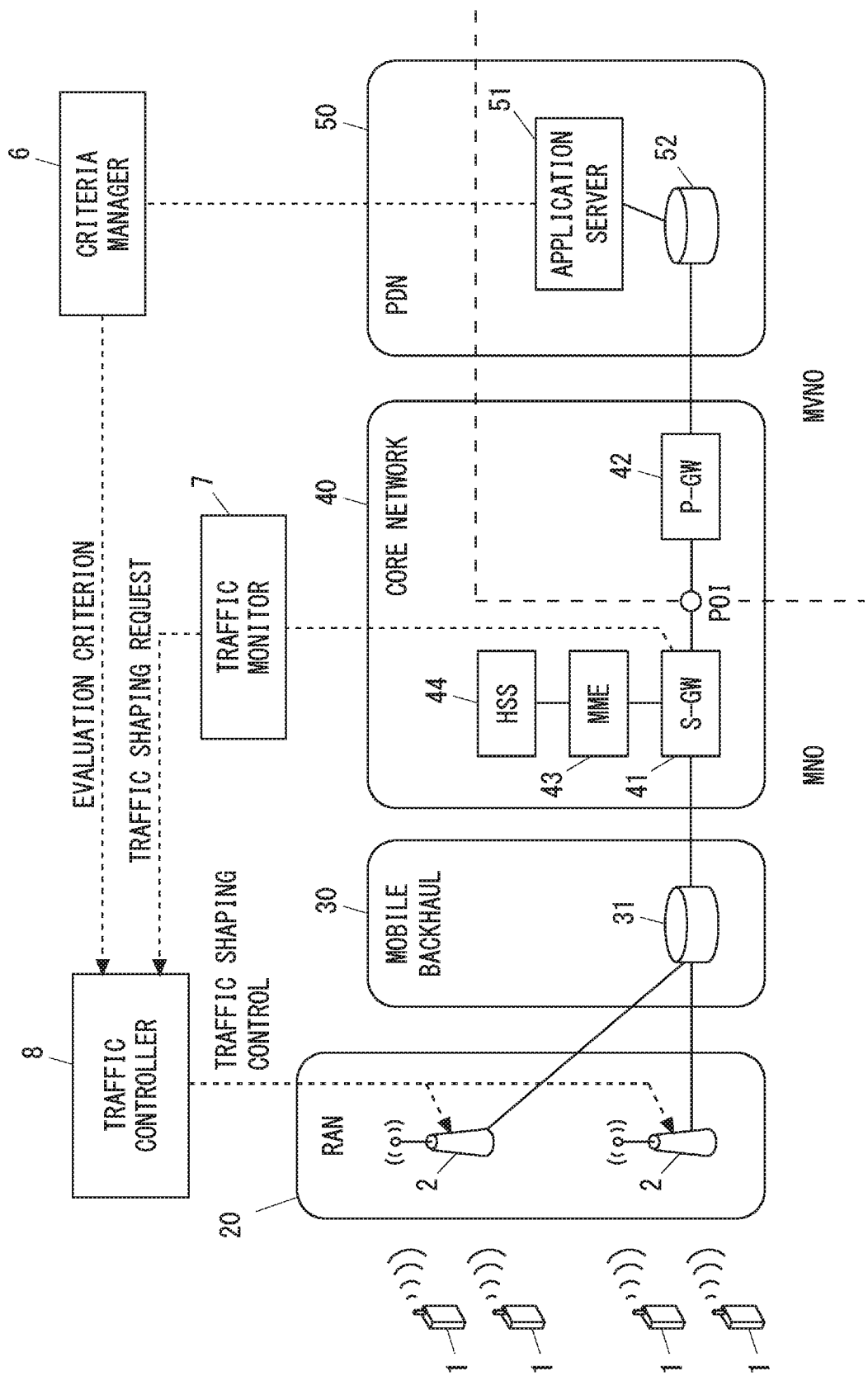
FIG. 1 is a block diagram showing a configuration example of a cellular communication network according to some embodiments.

FIG. 1 shows a configuration example of a cellular communication network according to some embodiments including this embodiment. In the example shown in FIG. 1, the cellular communication network includes an RAN 20 and a core network 40 (e.g., Evolved Packet Core (EPC)). The RAN 20 may include, for example, a UTRAN or an E-UTRAN, or both. The core network 40 may include a UMTS core network or an EPC, of both.

One or more base stations 2 are arranged in the RAN 20. Each base station 2 may be, for example, a UTRAN RNC an E-UTRAN eNB. The base station 2 is configured to communicate with a plurality of wireless terminals 1 connected to the RAN 20 and to provide radio resource management for these wireless terminals 1. For example, the radio resource management includes: establishment, modification and release of radio connection (e.g., a Radio Resource Control (RRC) connection) with each wireless terminal 1; scheduling (i.e., radio resource allocation) for downlink transmission and uplink transmission of each wireless terminal 1; and control of handover of each wireless terminal 1. Each wireless terminal 1 may be a terminal having mobility or a stationary terminal having no mobility. Each wireless terminal 1 may be an IoT device.

The base station 2 may be a macrocell base station or a femtocell base station. The base station 2 may be a Baseband Unit (BBU) used in a Centralized Radio Access Network (C-RAN) architecture. In other words, the base station 2 shown in FIG. 1 may be an RAN node connected to one or more Remote Radio Heads (RRHs). In some implementations, the base station 2 serving as a BBU is connected to the core network 40 and is responsible for control-plane processing including radio resource management and for digital baseband signal processing for the user plane. Besides, the RRU is responsible for analog Radio Frequency (RF) signal processing (e.g., frequency conversion and signal amplification). The C-RAN is also referred to as a Cloud RAN. The BBU is also referred to as a Radio Equipment Controller (REC) or a Data Unit (DU). The RRH is also referred to as a Radio Equipment (RE), a Radio Unit (RU), or a Remote Radio Unit (RRU).

Furthermore, there is another C-RAN architecture in which a part of the baseband signal processing is arranged in a remote site. In some implementations, layer-1 (i.e., physical layer) baseband signal processing may be performed at the remote site, while layer-2 (i.e., MAC sublayer, RLC sublayer, and Packet data Convergence Protocol (PDCP) sublayer) signal processing and layer-3 signal processing may be performed at a central site. In some implementations, the layer-1 signal processing and a part or the entirety of the layer-2 signal processing may be performed at the remote site, while the layer-3 signal processing may be performed at the central site. The base station 2 shown in FIG. 1 may be a data unit located in the central site in these C-RAN architectures.

The core network 40 is a network which is managed mainly by an MNO. As described below, some network elements in the core network 40 may be managed by an MVNO. The core network 40 includes a plurality of user plane entities and a plurality of control plane entities. The user plane entities relay user packets of the wireless terminals 1 between the RAN 20 and an external network (e.g., Packet Data Network (PDN)) 50. The control plane entities perform various types of control for the wireless terminals 1, such as mobility management, session management (or bearer management), subscriber information management, and billing management. For example, as shown in FIG. 1, the core network 40 may include at least one Serving Gateway (S-GW) 41, at least one Packet Data Network Gateway (P-GW) 42, at least one Mobility Management Entity (MME) 43, and at least one Home Subscriber Server (HSS) 44. As is well known in the art, the S-GW 41 and the P-GW 42 are user plane entities of the EPC, while the MME 43 and the HSS 44 are control plane entities of the EPC.

The external network 50 is a packet data network. The external network 50 includes, for example, the Internet, a network of another mobile operator (e.g., MVNO), or a network of a service operator, or any combination thereof. In the example of FIG. 1, the external network 50 includes at least one application server 51. The application server 51 performs packet communication (e.g., live video streaming, Web access, VoIP call, voice chat, or online game) with each wireless terminal 1. That is, the application server 51 receives user packets (e.g., IP packets) originated from each wireless terminal 1 and sends user packets addressed to each wireless terminal 1. As shown in FIG. 1, at least one router 52 may be disposed between a gateway (e.g., P-GW 42) of the core network 40 and the application server 51. The router 52 performs routing and forwarding of user packets within the external network 50 or between the core network 40 and the external network 50.

In some implementations, the cellular communication network according to this embodiment may include a mobile backhaul 30. The mobile backhaul 30 connects one or more base stations in the RAN 20 to the core network 40. As already described, the mobile backhaul 30 may include a physical layer (i.e., layer-1) network and a packet transport network which transfers IP packets on the physical layer network, to provide IP packet transfer service between each base station and the core network 40. The physical layer network includes optical fibers (e.g., PON, SONET/SDH, or WDM), copper lines (e.g., an E1/T1 network or Digital Subscriber Lines (DSLs)), or radio links (e.g., microwave point-to-point links), or any combination thereof. The packet transport network uses, for example, a Virtual Local Area Network (VLAN) technique, or a Multi-Protocol Label Switching (MPLS) technique, or a combination thereof.

In the example of FIG. 1, the mobile backhaul 30 includes at least one router 31. The router 31 performs routing and forwarding of user packets, more specifically tunnel packets encapsulating user packets, between the RAN 20 and the core network 40. The router 31 is, for example, an IP router. The tunnel packets encapsulating user packets are, for example, GPRS Tunneling Protocol (GTP) tunnel packets, Generic Routing Protocol (GRE) tunnel packets or IPsec tunnel packets.

In some implementations, as shown in FIG. 1, the P-GW 42 may be managed by the MVNO. In this case, the boundary (i.e., POI) between the MNO network and the MVNO network is positioned between the S-GW 41 and the P-GW 42. The P-GW 42 of the MVNO communicates with the S-GW 41 of the MNO using a tunnel control protocol (e.g., GTP-C), configures a tunnel (e.g., a GTP tunnel or an S5 bearer) between the S-GW 41 and the P-GW 42 for user packet transfer, and manages an end-to-end bearer (e.g., Evolved Packet System (EPS) bearer) for each wireless terminal 1. The configuration shown in FIG. 1 is a merely example. For example, the POI between the MNO and the MVNO may be provided between the P-GW 42 and the external network 50.

Next, traffic control according to this embodiment will be described in detail. In this embodiment, the cellular communication network includes a criteria manager 6, a traffic monitor 7, and a traffic controller 8. The criteria manager 6, the traffic monitor 7, and the traffic controller 8 enable each base station 2 or a packet transfer node (e.g., router 31) in the mobile backhaul 30 to perform traffic shaping (or packet shaping) on packets sent from the RAN 20 (i.e., each base station 2) to the core network 40.

The criteria manager 6 manages an evaluation criterion for deciding a priority of each wireless terminal 1 or each packet flow transmitted by each wireless terminal 1. The criteria manager 6 transmits the evaluation criterion to the traffic controller 8. The evaluation criterion is used by the traffic controller 8 to determine one or more packet flows on which the traffic shaping performed by each base station 2 within the RAN 20 or by a packet transfer node (e.g., router 31) within the mobile backhaul 30 is to be imposed (i.e., one or more packet flows on which transmission rate reduction is to be imposed).

The evaluation criterion may include first information indicating a unit for specifying a packet flow(s) to be preferentially transmitted. The first information may define that a packet flow(s) to be preferentially transmitted needs to be specified on a per-base station basis, a per-cell basis, a per-wireless terminal basis, a bearer basis, or a per-service basis. These bases for specifying a packet flow(s) may be used in combination as appropriate. In addition, or alternatively, the evaluation criterion may include second information for specifying a packet flow to be preferentially transmitted. The second information may indicate at least one of: (a) a geographical area; (b) a type of a base station, cell, terminal, wireless terminal, bearer, or service; and (c) an identifier of a base station, cell, terminal, wireless terminal, bearer, or service. These information elements (i.e., the geographical area, the type, and the identifier) for specifying a packet(s) flow may be used in combination as appropriate.

The determination of a packet flow(s) on which the traffic shaping is to be imposed may be performed on a per-wireless terminal basis. In addition, or alternatively, a packet flow(s) on which the traffic shaping is to be imposed may be determined, for example, on a per-bearer basis or a per-service basis that are finer than a per-wireless terminal basis. Determination on a per-service basis distinguishes between packet flows related to a plurality of services assigned to one bearer. In addition, or alternatively, a packet flow(s) on which the traffic shaping is to be imposed may be determined, for example, on a per-wireless terminal group basis, a per-cell basis, or a per-base station basis that are rougher than a per-wireless terminal basis. The above-described bases for specifying a packet flow(s) may be used in combination as appropriate.

In some implementations, the evaluation criterion may be associated with a specific geographical area. More specifically, the evaluation criterion may indicate that the priority of a first wireless terminal located within the specific geographical area is higher than the priority of a second wireless terminal located outside the specific geographical area. For example, the criteria manager 6 may use the evaluation criterion to notify the traffic controller 8 of the specific geographical area covering a place or an area where a specific event (e.g., a traffic jam, a traffic accident, heavy rain or a natural disaster) is occurring. The traffic controller 8 may control, according to the evaluation criterion, traffic shaping performed by the base station 2 or the packet transfer node in a manner such that a transmission rate of a packet flow of the first wireless terminal, which has a higher priority than the second wireless terminal, is higher than a transmission rate of a packet flow of the second wireless terminal. Consequently, the base station 2 or the packet transfer node can transmit, to the core network 40, packets of the first wireless terminal located within the specific geographical area more preferentially than packets of the second wireless terminal.

The traffic controller 8 may decide that, when a position (e.g., GNSS position information obtained by a Global Navigation Satellite System (GNSS) receiver) of a wireless terminal 1 is within the specific geographical area, this wireless terminal 1 is within this specific geographical area. Alternatively, the traffic controller 8 may decide that, when an installation position of a base station 2 is within the specific geographical area, this base station 2 and wireless terminals 1 connected to this base station 2 are located within the specific geographical area. Alternatively, the traffic controller 8 may decide that, when the installation position of a base station 2 which provides a cell is within the specific geographical area, this cell, this base station and wireless terminals 1 connected to this base station 2 are located within the specific geographical area. Alternatively, the traffic controller 8 may decide that, when the position of a wireless terminal 1 which uses a bearer or a service is within the specific geographical area, this wireless terminal 1 and this bearer or service used by this wireless terminal 1 are located within the specific geographical area.

In addition, or alternatively, the evaluation criterion may indicate a type of the first wireless terminal (or service, bearer, terminal group, cell, or base station) preferred more than the second wireless terminal (or service, bearer, terminal group, cell, or base station). Alternatively, the evaluation criterion may indicate an identifier of the first wireless terminal (or service, bearer, terminal group, cell, or base station) preferred more than the second wireless terminal (or service, bearer, terminal group, cell, the base station). For example, the traffic controller 8 may control traffic shaping at the base station 2 or at the packet transfer node according to one of these criteria in a manner such that the transmission rate of a packet flow(s) of the first wireless terminal (or service, bearer, terminal group, cell, or base station), which has a higher priority than the second wireless terminal (or service, bearer, terminal group, cell, or base station), is higher than the transmission rate of a packet flow(s) of the second wireless terminal (or service, bearer, terminal group, cell, or base station).

The evaluation criterion may include information for enabling the traffic controller 8 to categorize a plurality of wireless terminals 1 or these packet flows into three or more priority levels. For example, the evaluation criterion may indicate a geographical area of the highest priority and a geographical area of the second highest priority. In this case, a geographical area which is included in neither the geographical area of the highest priority nor the geographical area of the second highest priority may be regarded as having the lowest priority. Alternatively, the evaluation criterion may indicate a terminal type (or identifier) of the highest priority and a terminal type (or identifier) of the second highest priority. In this case, a terminal type (or identifier) which is different from the terminal types (or identifiers) of the highest priority and the second highest priority may be regarded as having the lowest priority.

The criteria manager 6 may communicate with the application server 51 and consider priority information (e.g., a preferred geographical area, a preferred terminal type, or a preferred identifier) desired by the application server 51 to generate the evaluation criterion to be sent to the traffic controller 8. The criteria manager 6 may be implemented by a computer different from the application server 51. For example, the criteria manager 6 may be arranged in a Mobile Edge Computing (MEC) server, an Operation Support System (OSS), or a Network Element Manager (NEM). Alternatively, the criteria manager 6 and the application server 51 may be implemented by a single computer. The criteria manager 6 may be managed by the MVNO or by the MNO.

Next, the traffic monitor 7 will be described. The traffic monitor 7 monitors a total transmission rate of a plurality of packet flows sent through the cellular communication network of the MNO from wireless terminals 1 to the specific external network 50. In some implementations, the traffic monitor 7 may monitor a transmission rate of packets sent to the P-GW 42 of the MVNO via the POI shown in FIG. 1. In this case, the traffic monitor 7 monitors a transmission rate measured at an egress port of the S-GW 41 which transmits packets to the P-GW 42. Alternatively, if the POI is provided between the P-GW 42 and the external network 50, the traffic monitor 7 may monitor a transmission rate measured at an egress port of the P-GW 42 which transmits packets to the external network 50.

The traffic monitor 7 generates a first control message in response to an increase in the monitored total transmission rate, and sends this message to the traffic controller 8. The first control message triggers the traffic controller 8 to execute traffic shaping at the base station 2 within the RAN 20 or at the packet transfer node within the mobile backhaul 30. The first control message can be referred to as a start request for traffic control (or traffic shaping).

For example, the traffic monitor 7 may transmit the first control message to the traffic controller 8 when the monitored total transmission rate exceeds a threshold R1, when the number of excesses of the threshold reaches a predetermined number, or when the duration of excess of the threshold exceeds a reference time. In some implementations, the threshold R1 may be set in accordance with an upper limit bandwidth determined in the agreement between the MNO and the MVNO. In other words, the traffic monitor 7 may generate the first control message based on comparison between a measurement value of the total transmission rate at the POI and the threshold R1 based on the agreement.

The traffic monitor 7 may request a traffic shaping level to the traffic controller 8. For example, the traffic monitor 7 may determine the traffic shaping level according to the magnitude of the difference between the monitored total transmission rate and the threshold R1 (i.e., the threshold excess amount). The traffic shaping level is associated with a target transmission rate used in the traffic shaping at the base station 2 or at the packet transfer node.

The traffic monitor 7 may transmit a second control message to the traffic controller 8 in response to insufficient reduction of the total transmission rate after transmission of the above first control message (i.e., start request for traffic shaping). In one example, the second control message may trigger the traffic controller 8 to increase the number of one or more packet flows (or the number of wireless terminals) on which the traffic shaping is to be imposed. In addition, or alternatively, the second control message may trigger the traffic controller 8 to further reduce the transmission rate of at least one of the one or more packet flows on which the traffic shaping has already been imposed. The second control message can be referred to as an update request for traffic control (or traffic shaping).

In the example just above described, the traffic monitor 7 and the traffic controller 8 can increase the traffic shaping level gradually (i.e., stepwise) after start of the traffic shaping, while taking into account a change in the total transmission rate. In other words, the traffic monitor 7 and the traffic controller 8 can reduce the target transmission rate used in the traffic shaping gradually (i.e., stepwise). These configuration and operation may be particularly effective when it is not possible to precisely predict how much the total transmission rate is reduced by the traffic shaping. For example, in some implementations, all the user packets of the wireless terminals 1 of the MVNO users are sent to the MVNO node (e.g., P-GW 42) via the POI. In this case, it is desirable that the traffic shaping is performed based on the total transmission rate measured at the traffic aggregation point (i.e., POI) so that the measured transmission rate does not exceed the total transmission rate determined in the agreement with the MVNO. Meanwhile, it is also desirable that a network apparatuses (e.g., base stations 2 or packet transfer nodes) close to traffic sources (i.e., wireless terminals) performs the actual processing of the traffic shaping so as to avoid unnecessarily sending the traffic on which the traffic shaping is imposed. However, it may be difficult to precisely predict the target transmission rate for the traffic shaping in each base station 2 or in each packet transfer node. This is because it is not always easy to precisely learn how many packets which need to be preferentially transmitted are included in the packets transferred by each base station 2 or each packet transfer node. In the example just above described, the traffic shaping level is updated stepwise, thereby making the total transmission rate eventually close to a target value without excessively suppressing the total transmission rate.

After transmitting the above-described first control message (i.e., start request for traffic shaping), the traffic monitor 7 may transmit a third control message to the traffic controller. The third control message triggers the traffic controller 8 to control the base station 2 or the packet transfer node (e.g., router 31) to stop the traffic shaping. The third control message can be referred to as a stop request for traffic control (or traffic shaping). The traffic monitor 7 may transmit the third control message when the monitored total transmission rate is sufficiently reduced. More specifically, the traffic monitor 7 may transmit the third control message when the monitored total transmission rate goes below a threshold R2. The threshold R2 may be a value smaller than the threshold R1.

The traffic monitor 7 may communicate with a node (e.g., the S-GW 41 or the P-GW 42) which performs traffic measurement to obtain a measurement result of the total transmission rate. The traffic monitor 7 may be arranged in a computer different from the node which performs the traffic measurement. For example, the traffic monitor 7 may be arranged in a MEC server, an OSS, or a NEM. Alternatively, the traffic monitor 7 may be arranged in the node (e.g., the S-GW 41 or the P-GW 42) which performs the traffic measurement.

The traffic monitor 7 may be managed by the MNO. Alternatively, the traffic monitor 7 may be managed by the MVNO. In the latter case, the traffic monitor 7 may monitor a transmission rate measured at an ingress port of the MVNO mode (e.g., the P-GW 42, the router 52, or the application server 51) connected to the POI.

Figure 2:
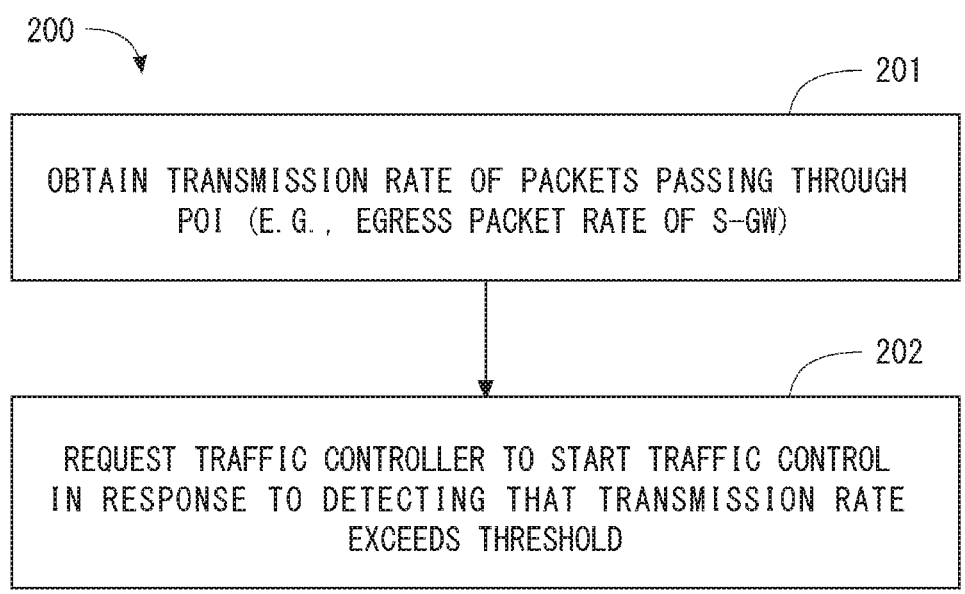
FIG. 2 is a flowchart showing an example of an operation of a traffic monitor according to a first embodiment.

FIG. 2 is a flowchart showing a process 200 that is an operation example of the traffic monitor 7. In step 201, the traffic monitor 7 obtains a measurement value of a transmission rate of packets passing through the POI between the MNO network and the MVNO network (e.g., an egress packet rate of the S-GW 41). In step 202, the traffic monitor 7 requests the traffic controller 8 to start the traffic control in response to detecting that the monitored transmission rate exceeds a threshold.

The traffic controller 8 will be described hereinafter. An outline of the operations of the traffic controller 8 is as described above in relation to the description of the criteria manager 6 and the traffic monitor 7. That is, the traffic controller 8 receives the evaluation criterion from the criteria manager 6 and determines, based on the evaluation criterion, one or more packet flows on which the traffic shaping is to be imposed. In addition, in response to receiving the first control message (i.e., start request for traffic control) from the traffic monitor 7, the traffic controller 8 controls the base station 2 or the packet transfer node (e.g., router 31) within the mobile backhaul 30 to execute the traffic shaping.

As already described, in response to receiving the second control message (i.e., update request for traffic control) from the traffic monitor 7, the traffic controller 8 may control the base station 2 or the packet transfer node (e.g., router 31) to increase the number of one or more packet flows (or the number of wireless terminals) on which the traffic shaping is to be imposed. In addition, or alternatively, the traffic controller 8 may control the base station 2 or the packet transfer node (e.g., router 31) to further reduce the transmission rate of at least one of the one or more packet flows on which the traffic shaping has already been imposed.

As already described, the traffic controller 8 may control the base station 2 or the packet transfer node (e.g., router 31) to stop traffic shaping in response to receiving the third control message (i.e., stop request for traffic control) from the traffic monitor 7.

The traffic controller 8 may communicate with the node (e.g., the base station 2 or the router 31) which executes traffic shaping to control the traffic shaping. The traffic controller 8 may be arranged in a computer different from the node which executes the traffic shaping. For example, the traffic controller 8 may be arranged in a MEC server, an OSS, or a NEM. Alternatively, the traffic controller 8 may be arranged in the node (e.g., the base station 2 or the router 31) which executes the traffic shaping.

Figure 3:
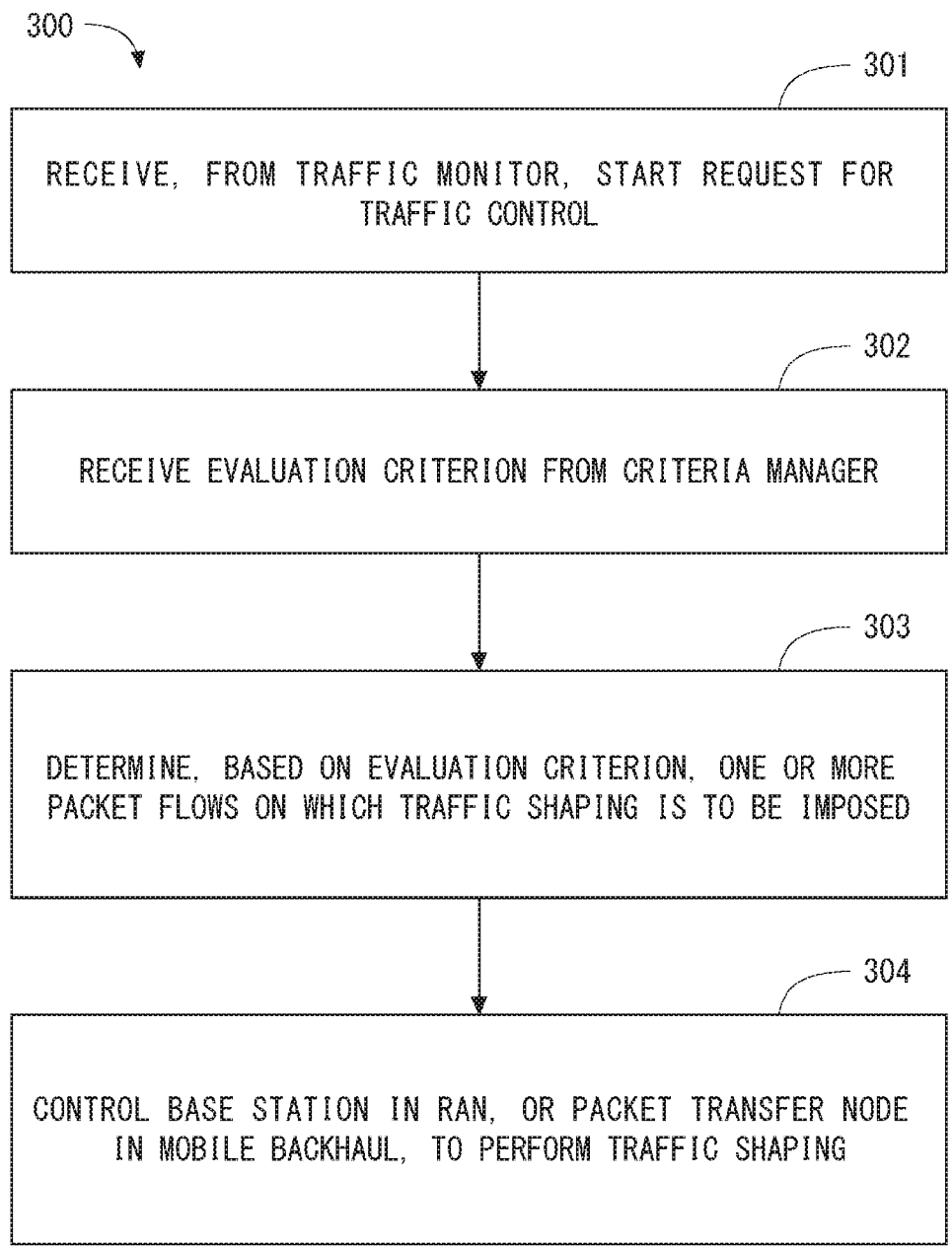
FIG. 3 is a flowchart showing an example of an operation of a traffic controller according to the first embodiment.

FIG. 3 is a flowchart showing a process 300 that is an operation example of the traffic controller 8. In step 301, the traffic controller 8 receives from the traffic monitor 7 a start request for traffic control. In step 302, the traffic controller 8 receives the evaluation criterion from criteria manager 6. In step 303, the traffic controller 8 determines, based on the evaluation criterion, one or more packet flows on which the traffic shaping is to be imposed. In step 304, the traffic controller 8 controls the base station 2 in the RAN 20 or the packet transfer node (e.g., router 31) in the mobile backhaul 30 to perform the traffic shaping.

The following provides a specific example of the traffic shaping. The base station 2 or the packet transfer node (e.g., router 31) may use an existing algorithm for the traffic shaping. For example, the base station 2 or the packet transfer node (e.g., router 31) may use a token bucket algorithm, or a leaky bucket algorithm, or a combination thereof. More specifically, the base station 2 or the packet transfer node (e.g., router 31) may classify respective packets according to the priorities of services, bearers, wireless terminals 1, cells, base stations, or any combination thereof, and then transmit each packet according to a packet transmission rate (i.e., Committed Information Rate (CIR)) according to its priority. More specifically, the base station 2 or the packet transfer node may discard packets the priorities of which are equal to or less than a threshold A, or may delay transmission of packet flows the priorities of which are equal to or less than the threshold A by a delay amount X. These operations may be triggered by the above-described first control message. Furthermore, the second control message may trigger the traffic controller 8 to increase the value of the threshold A of the priorities or increase the value of the delay amount X.

In one example, the traffic shaping may be performed on a per-wireless terminal basis by distinguishing between source wireless terminals 1 based on transmission source addresses contained in respective user packets. The packet transfer node in the mobile backhaul 30 may distinguish between source wireless terminals 1 of user packets by executing Deep Packet Inspection (DPI) on respective tunnel packets.

In one example, the traffic shaping may be performed on a per-bearer basis by distinguishing between bearers (tunnels) to which tunnel packets belong based on their respective tunneling protocol headers (e.g., GTP-U headers) contained in these tunnel packets. The packet transfer node in the mobile backhaul 30 may distinguish between bearers to which respective tunnel packets belong by executing Deep Packet Inspection (DPI) on these tunnel packets.

In one example, the traffic shaping may be performed on a per-service basis by distinguishing between services to which user packets belong by using port numbers in their respective Transmission Control Protocol (TCP) headers or User Datagram Protocol (UDP) headers contained in these user packets. The base station 2 may distinguish between services to which respective user packets belong by executing Deep Packet Inspection (DPI) on these user packets. The packet transfer node in the mobile backhaul 30 may distinguish between services to which respective tunnel packets belong by executing Deep Packet Inspection (DPI) on these tunnel packets.

In one example, the traffic shaping may be performed on a per-base station basis by distinguishing between transmission source base stations 2 by using source addresses contained in tunneling protocol headers (e.g., GTP-U headers) of respective tunnel packets. The packet transfer node in the mobile backhaul 30 may distinguish between transmission source base stations 2 of respective tunnel packets by executing Deep Packet Inspection (DPI) on these tunnel packets. Alternatively, in the traffic shaping on a per-base station basis, a specific base station 2 may perform traffic shaping on all the user packets (or tunnel packets) that it transmits.

In one example, in the traffic shaping on a per-cell basis, the base station 2 may specify the source wireless terminal 1 of a user packet and the cell to which this wireless terminal 1 is connected, thereby specifying the cell to which the user packet belongs.

The base station 2 may store user packets received from each wireless terminal 1 through a radio bearer in a transmission buffer per EPS bearer, and perform traffic shaping on transmission buffers for respective EPS bearers. Consequently, the base station 2 can perform the traffic shaping on a per-bearer basis.

As can be seen from the above description, in this embodiment, the traffic controller 8 is configured to receive from the criteria manager 6 an evaluation criterion for deciding a priority of each packet flow transmitted by at least one wireless terminal 1. In addition, the traffic controller 8 is configured to determine, based on the evaluation criterion, one or more packet flows on which traffic shaping is to be imposed. Furthermore, the traffic controller 8 is configured to receive, from the traffic monitor 7, an instruction of traffic control based on a monitoring result of the total transmission rate at a predetermined point (e.g., POI) in the core network 40 or in the external network 50. Furthermore, the traffic controller 8 is configured to, in response to the instruction, control the base station 2 or the packet transfer node (e.g., router 31) in the mobile backhaul 30 to execute the traffic shaping. Consequently, the criteria manager 6, the traffic monitor 7, and the traffic controller 8 can contribute to adjustment of traffic that passes through the cellular communication network (i.e., core network 40) based on the monitoring result of the total transmission rate of traffic sent from the cellular communication network (i.e., core network 40) to the external network 50.

For example, the traffic shaping which is realized by the criteria manager 6, the traffic monitor 7 and the traffic controller 8 according to this embodiment can contribute to transmission of packets of a specific wireless terminal 1 preferentially to the external network 50 while maintaining traffic that passes through the POI such that it does not exceeds the total transmission rate determined in the agreement with the MVNO.

Second Embodiment

This embodiment provides a modified example of the traffic shaping described in the first embodiment. A configuration example of a cellular communication network according to this embodiment is the same as that of FIG. 1. In this embodiment, the traffic controller 8 is further configured to request the base station 2 to perform uplink radio resource allocation in accordance with the above-described traffic shaping executed by the base station 2 or by a packet transfer node within the mobile backhaul 30.

Figure 4:
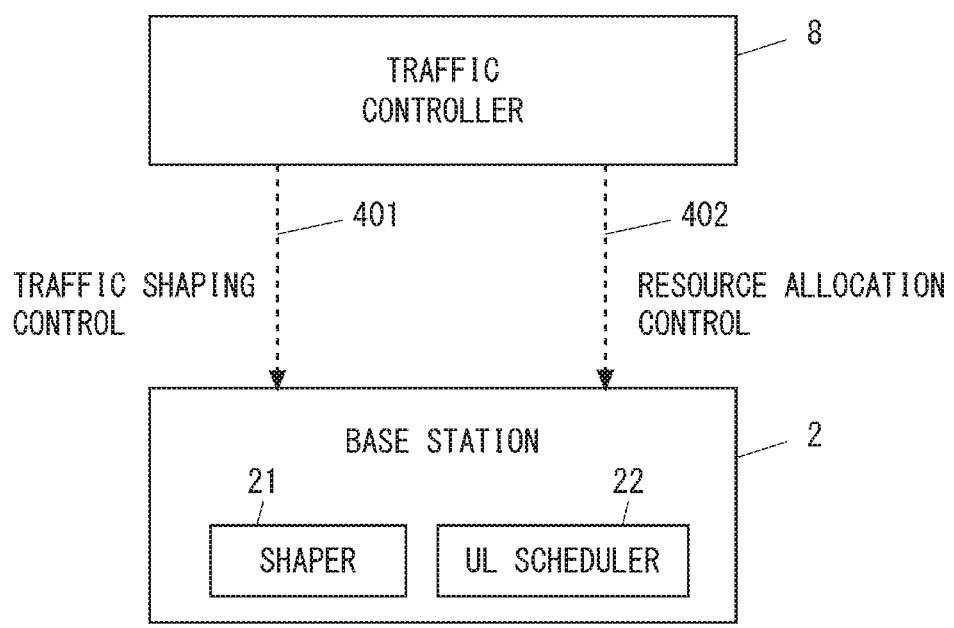
FIG. 4 is a block diagram showing a traffic controller and a base station according to a second embodiment.

FIG. 4 is a diagram showing interactions between the traffic controller 8 and the base station 2 according to this embodiment. In the example of FIG. 4, the traffic controller 8 transmits a traffic shaping control signal 401 and a resource allocation control signal 402 to the base station 2. In the example of FIG. 4, the base station 2 includes a traffic shaper 21 and an uplink (UL) scheduler 22. The traffic shaper 21 executes packet shaping at an egress port from the base station 2 to the mobile backhaul 30, or to a core network 40, according to the traffic shaping control signal 401. The UL scheduler 22 adjusts a UL radio resource amount to be allocated to a wireless terminal 1 on which the traffic shaping is to be imposed, according to the resource allocation control signal 402.

Figure 5:
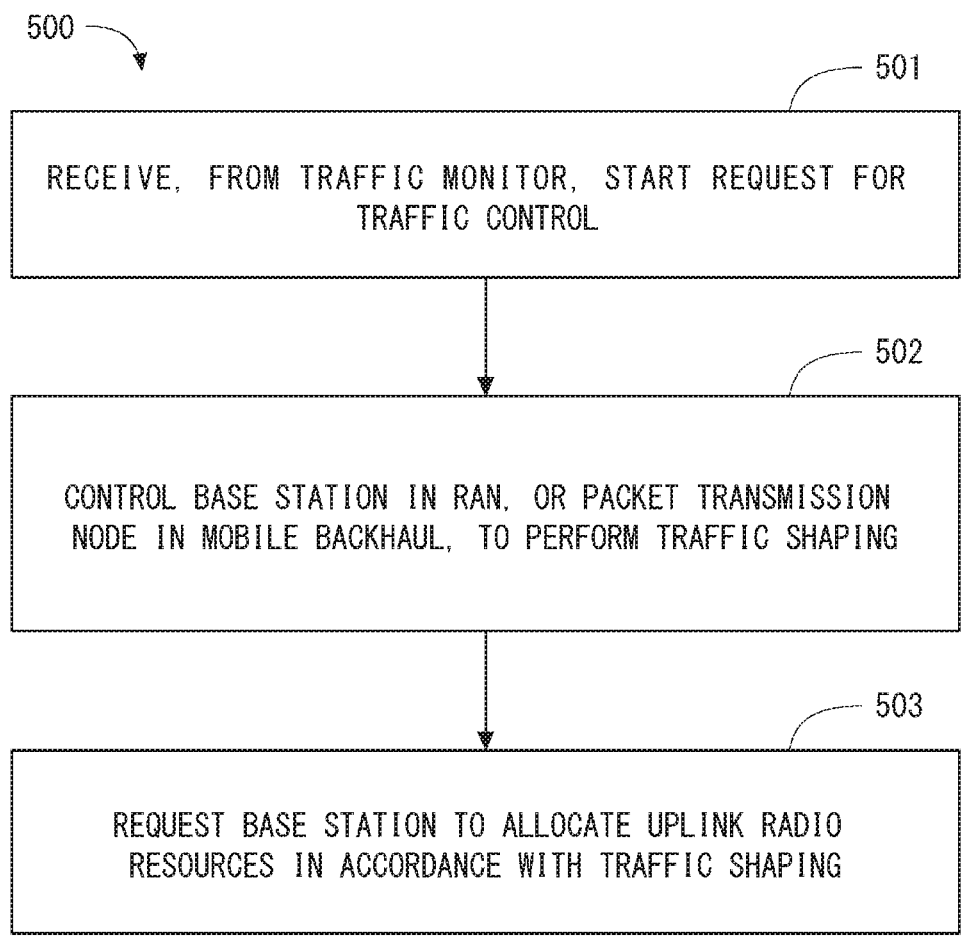
FIG. 5 is a flowchart showing an example of an operation of a traffic controller according to the second embodiment.

FIG. 5 is a flowchart showing a process 500 that is an operation example of the traffic controller 8. In step 501, the traffic controller 8 receives from the traffic monitor 7 a start request for traffic control. In step 502, the traffic controller 8 controls the base station 2 or the packet transfer node in the mobile backhaul 30 to perform traffic shaping. In step 503, the traffic controller 8 requests the base station 2 to allocate uplink radio resources in accordance with the traffic shaping.

For example, the traffic controller 8 may request the base station 2 to reduce uplink radio resources to be allocated to a wireless terminal 1 which transmits a lower priority packet flow whose transmission rate is reduced by the above-described traffic shaping. According to this control, it is possible to adjust the transmission rate of the wireless terminal 1 in the RAN 20 according to the transmission rate between the base station 2 and the core network 4 that this wireless terminal 1 can actually use. More specifically, it is possible to suppress excessive allocation of uplink radio resources to this wireless terminal 1, and to allocate more uplink radio resources to wireless terminals 1 of a higher priority. Furthermore, it is possible to reduce uplink interference to the surroundings, and thus contribute to improvement of an uplink throughput of a wireless terminal which has a higher priority and is connected to a neighboring base station.

Furthermore, after stopping the traffic shaping, the traffic controller 8 may request the base station 2 to temporarily allocate uplink radio resources, larger than those allocated before starting the traffic shaping, to a wireless terminal 1 that transmits a lower priority packet flow the transmission rate of which has been reduced by the traffic shaping. According to this control, it is possible to reduce packets discarded due to a transmission buffer overflow of this wireless terminal 1.

In addition, or alternatively, the traffic controller 8 may request the base station 2 to guarantee allocation of uplink radio resources to a wireless terminal 1 that transmits a higher priority packet flow the transmission rate of which is guaranteed by the traffic shaping. According to this control, it is possible to adjust the transmission rate of this wireless terminal 1 in the RAN 20 according to the transmission rate between the base station 2 and the core network 4 that the wireless terminal 1 can actually use.

Third Embodiment

This embodiment provides a modified example of the traffic shaping described in the first embodiment. A configuration example of a cellular communication network according to this embodiment is the same as that of FIG. 1. In this embodiment, the traffic controller 8 is further configured to instruct each wireless terminal 1 to suppress data transmission according to the above-described traffic shaping executed by the base station 2 or by a packet transfer node in the mobile backhaul 30. The instruction from the traffic controller 8 to each wireless terminal 1 may be made on the user plane through the cellular communication network. For example, the traffic controller 8 may request the application server 51 to transmit an instruction for suppressing data transmission and thereby transmit this instruction to each wireless terminal 1 via the application server 51. According to this control, it is possible to adjust the packet transmission rate of the wireless terminal 1 according to the transmission rate between the base station 2 and the core network 4 that the wireless terminal 1 can actually use. In addition, it can be expected that reducing by the wireless terminal 1 of its transmission rate causes reduction in the allocation of uplink radio resources to this wireless terminal 1, thereby suppressing excessive allocation of uplink radio resources to this wireless terminal 1.

Fourth Embodiment

Figure 6:
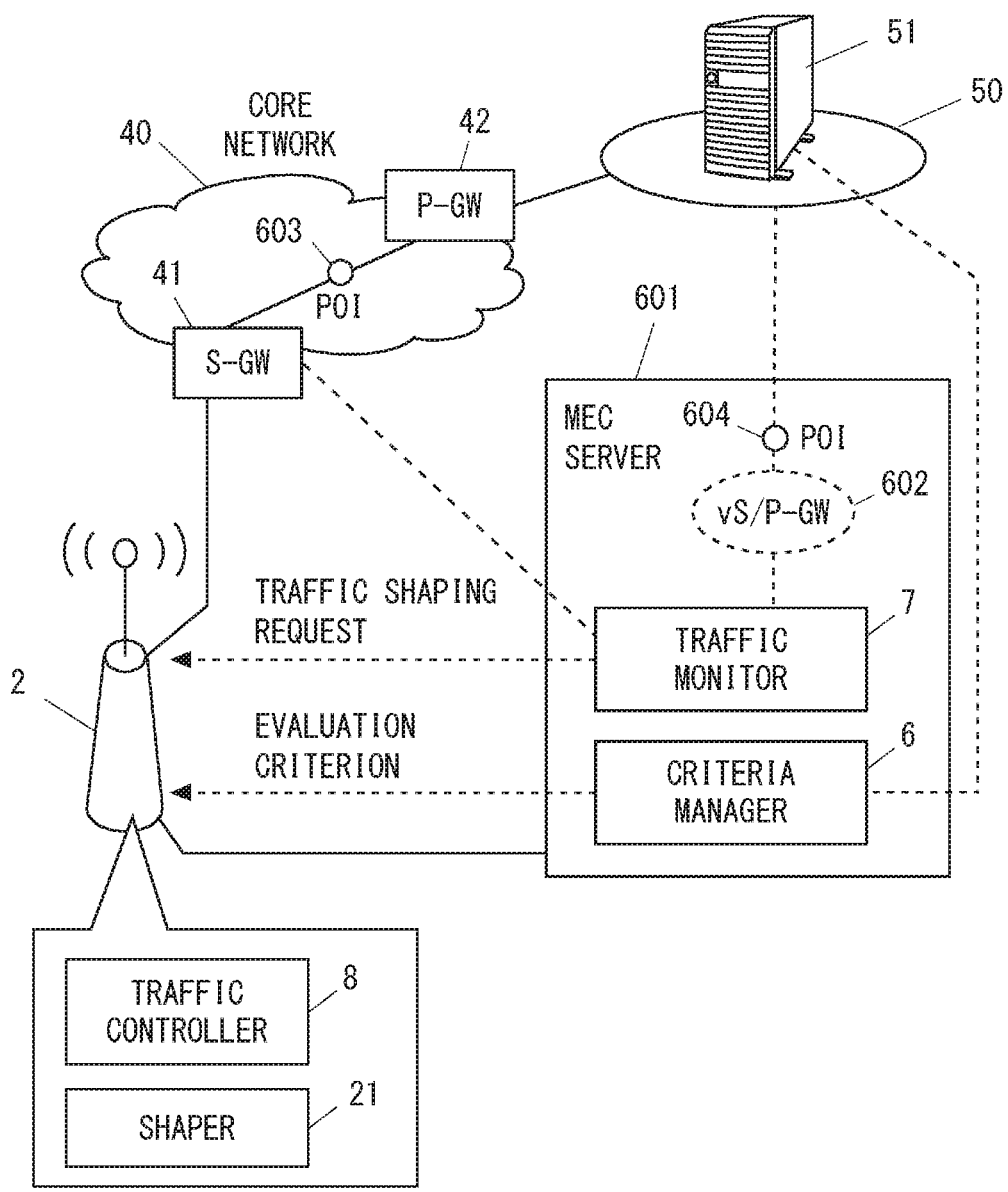
FIG. 6 is a block diagram showing a configuration example of a cellular communication network according to some embodiments.

This embodiment provides some specific examples of an arrangement of the criteria manager 6, the traffic monitor 7 and the traffic controller 8 described in the first to third embodiments. FIG. 6 shows an example of the arrangement of the criteria manager 6, the traffic monitor 7 and the traffic controller 8. In the example of FIG. 6, the criteria manager 6 and the traffic monitor 7 are arranged in a Mobile Edge Computing (MEC) server 601, and the traffic controller 8 is arranged in the base station 2.

The MEC server 601 is installed so that is able to communicate directly (i.e., not through the core network 40) with an RAN node (e.g., base station 2). The MEC server 601 can be referred to as an edge server. In the example of FIG. 6, the MEC server 601 is installed so as to communicate directly with the base station 2. In some implementations, the MEC server 601 may be physically integrated with the base station 2. In some implementations, the MEC server 601 may be installed in the same building (site) as the base station 2, and may be connected to a Local Area Network (LAN) in this site so that the MEC server 601 is able to communicate with the base station 2.

The MEC server 601 may be configured to provide at least one of a computing resources and storage resources (or storage capacity) for edge computing regarding services or applications directed to one or more wireless terminals 1. In some implementations, the MEC server 601 may provide hosting environment for MEC applications by providing Infrastructure as a Service (IaaS) facilities or Platform as a Service (PaaS) facilities.

The MEC server 601 may further include part of the functions of the core network 40. For example, the MEC server 601 may include the S-GW or S/P-GW functions and terminate a bearer (i.e., EPS bearer) of the wireless terminal 1 which uses the MEC. The MEC is based on a virtualized platform, similar to Network Function Virtualization (NFV). Hence, the MEC server 601 may host network functions including a virtualized S/P-GW (vS/P-GW) 602 as well as MEC applications.

For example, the traffic monitor 7 arranged in the MEC server 601 may monitor a total data transmission rate on a POI 603 which is measured at an egress port of the remote S-GW 41. Alternatively, the traffic monitor 7 arranged in the MEC server 601 may monitor a total data transmission rate on a POI 604 which is measured at an egress port of the vS/P-GW 602 of the MEC server 601.

Figure 7:
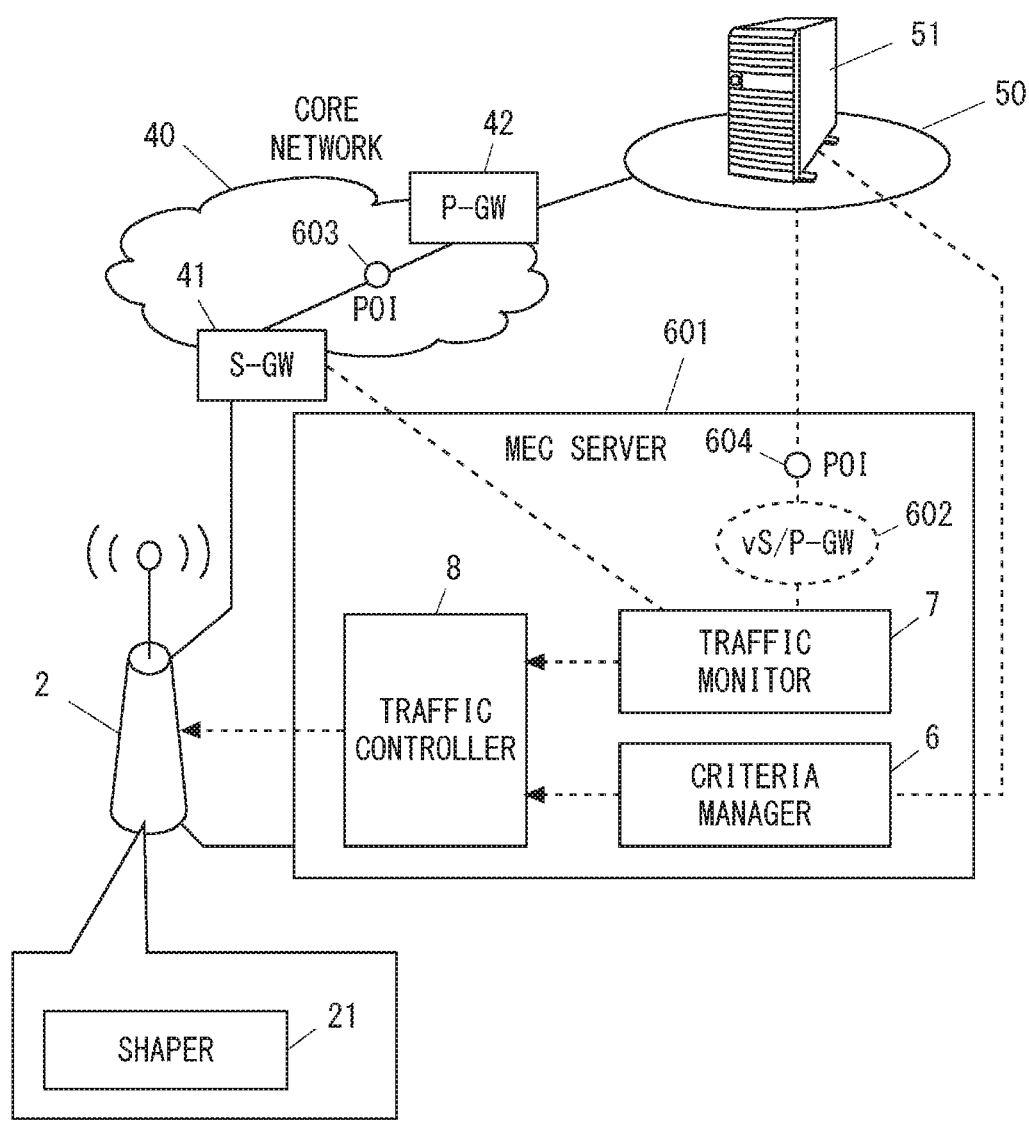
FIG. 7 is a block diagram showing a configuration example of a cellular communication network according to some embodiments.

FIG. 7 shows another example of the arrangement of the criteria manager 6, the traffic monitor 7 and the traffic controller 8. In the example of FIG. 7, the criteria manager 6, the traffic monitor 7 and the traffic controller 8 are arranged in the MEC server 601. Similar to the example of FIG. 6, the traffic monitor 7 may monitor a total data transmission rate at the POI 603 which is measured at an egress port of the remote S-GW 41. Alternatively, the traffic monitor 7 arranged in the MEC server 601 may monitor a total data transmission rate at the POI 604 which is measured at an egress port of the vS/P-GW 602 of the MEC server 601.

Figure 8:
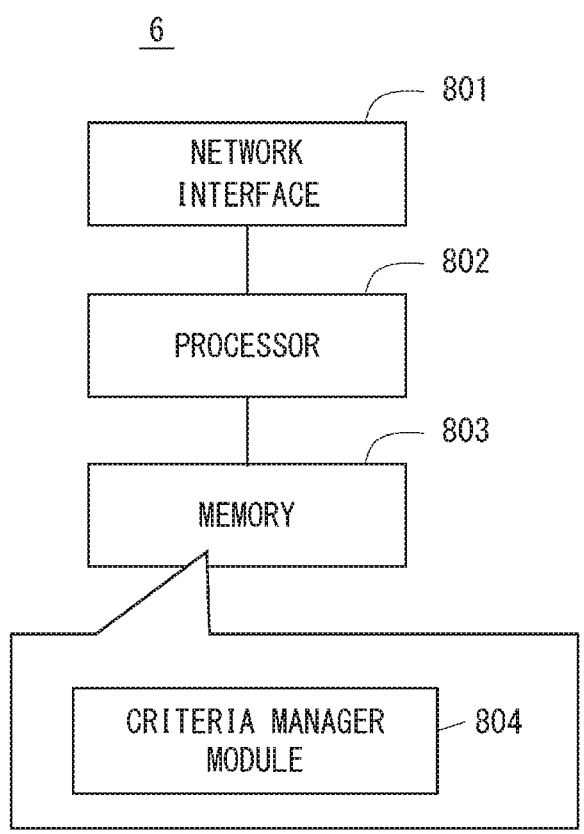
FIG. 8 is a block diagram showing a configuration example of a criteria manager according to some embodiments.

Lastly, configuration examples of the criteria manager 6, the traffic monitor 7, the traffic controller 8, the base station 2, and the MEC server 601 according to the above embodiments will be described hereinafter. FIG. 8 is a block diagram showing a configuration example of the criteria manager 6. Referring to FIG. 8, the criteria manager 6 includes a network interface 801, a processor 802, and a memory 803. The network interface 801 is used to communicate with other nodes (e.g., the traffic controller 8 and the application server 51). The network interface 801 may include, for example, a network interface card (NIC) conforming to the IEEE 802.3 series.

The processor 802 loads software modules (or computer programs) from the memory 803 and executes the loaded software modules, thereby performing processing of the criteria manager 6 described in the above embodiments with reference to the sequence diagrams and flowcharts. The processor 802 may be, for example, a microprocessor, a Micro Processing Unit (MPU), or a Central Processing Unit (CPU). The processor 802 may include a plurality of processors.

The memory 803 is composed of a combination of a volatile memory and a nonvolatile memory. The memory 803 may include a plurality of physically-independent memory devices. The volatile memory is, for example, a Static Random Access Memory (SRAM), a Dynamic RAM (DRAM), or a combination thereof. The nonvolatile memory is, for example, a Read Only Memory (MROM), an Electrically Erasable Programmable ROM (EEPROM), a flash memory, a hard disk drive, or any combination thereof. The memory 803 may include a storage located apart from the processor 802. In this case, the processor 802 may access the memory 803 through an I/O interface (not shown).

In the example of FIG. 8, the memory 803 is used to store software modules including a criteria manager module 804. The processor 802 loads these software modules from the memory 803 and executes the loaded software modules, thereby performing the processing of the criteria manager 6 described in the above embodiments.

Figure 9:
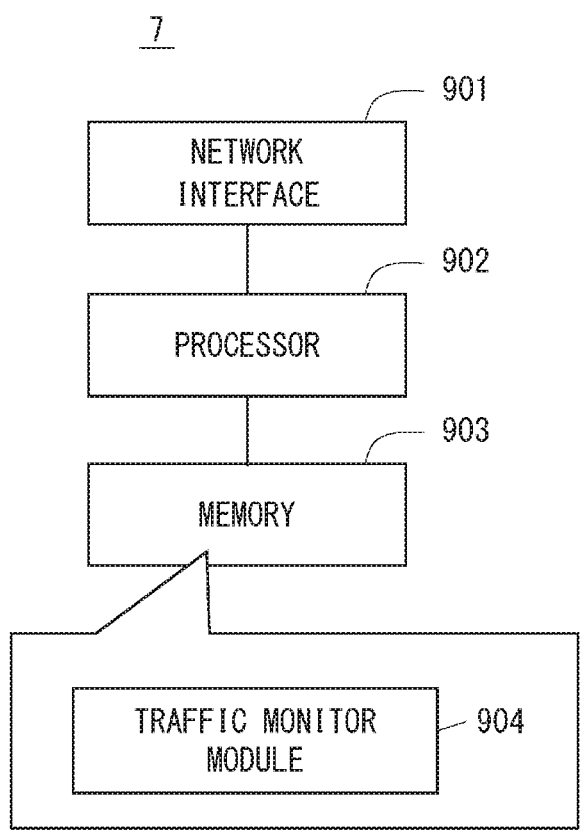
FIG. 9 is a block diagram showing a configuration example of a traffic monitor according to some embodiments.

FIG. 9 is a block diagram showing a configuration example of the traffic monitor 7. Referring to FIG. 9, the traffic monitor 7 includes a network interface 901, a processor 902, and a memory 903. The network interface 801 is used to communicate with other nodes (e.g., the traffic controller 8 and the S-GW 41). The network interface 901 may include, for example, a network interface card (NIC) conforming to the IEEE 802.3 series.

The processor 902 loads software modules (or computer programs) from the memory 903 and executes the loaded software modules, thereby performing processing of the traffic monitor 7 described in the above embodiments with reference to the sequence diagrams and flowcharts. The processor 902 may be, for example, a microprocessor, an MPU, or a CPU. The processor 902 may include a plurality of processors.

The memory 903 is composed of a combination of a volatile memory and a nonvolatile memory. The memory 903 may include a plurality of physically-independent memory devices. The memory 903 may include a storage located apart from the processor 902. In this case, the processor 902 may access the memory 903 through an I/O interface (not shown).

In the example of FIG. 9, the memory 903 is used to store software modules including a traffic monitor module 904. The processor 902 loads these software modules from the memory 903 and executes the loaded software modules, thereby performing the processing of the traffic monitor 7 described in the above embodiments.

Figure 10:
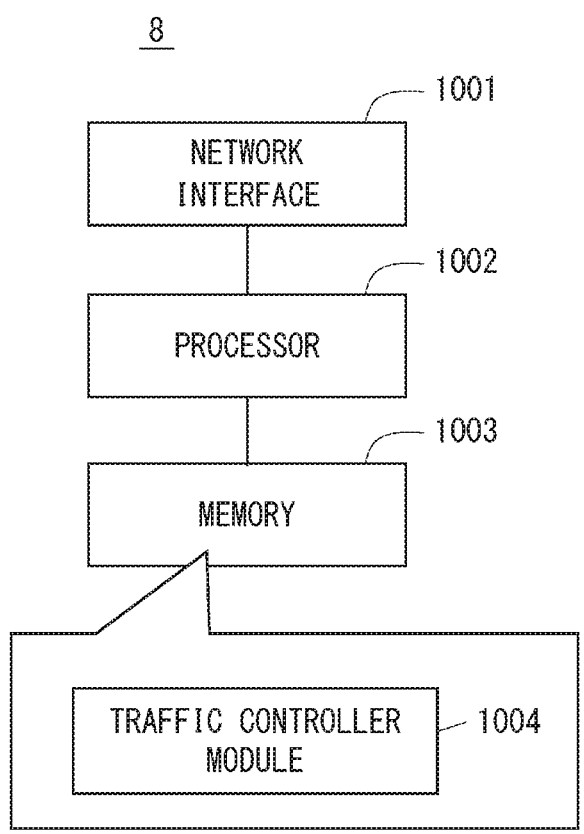
FIG. 10 is a block diagram showing a configuration example of a traffic controller according to some embodiments.

FIG. 10 is a block diagram showing a configuration example of the traffic controller 8. Referring to FIG. 10, the traffic controller 8 includes a network interface 1001, a processor 1002, and a memory 1003. The network interface 1001 is used to communicate with other nodes (e.g., the criteria manager 6, the traffic monitor 7, the base station 2, and the router 31). The network interface 1001 may include, for example, a network interface card (NIC) conforming to the IEEE 802.3 series.

The processor 1002 loads software modules (or computer programs) from the memory 1003 and executes the loaded software modules, thereby performing processing of the traffic controller 8 described in the above embodiments with reference to the sequence diagrams and flowcharts. The processor 1002 may be, for example, a microprocessor, an MPU, or a CPU. The processor 1002 may include a plurality of processors.

The memory 1003 is composed of a combination of a volatile memory and a nonvolatile memory. The memory 1003 may include a plurality of physically-independent memory devices. The memory 1003 may include a storage located apart from the processor 1002. In this case, the processor 1002 may access the memory 903 through an I/O interface (not shown).

In the example of FIG. 10, the memory 1003 is used to store software modules including a traffic controller module 1004. The processor 1002 loads these software modules from the memory 1003 and executes the loaded software modules, thereby performing the processing of the traffic controller 8 described in the above embodiments.

Figure 11:
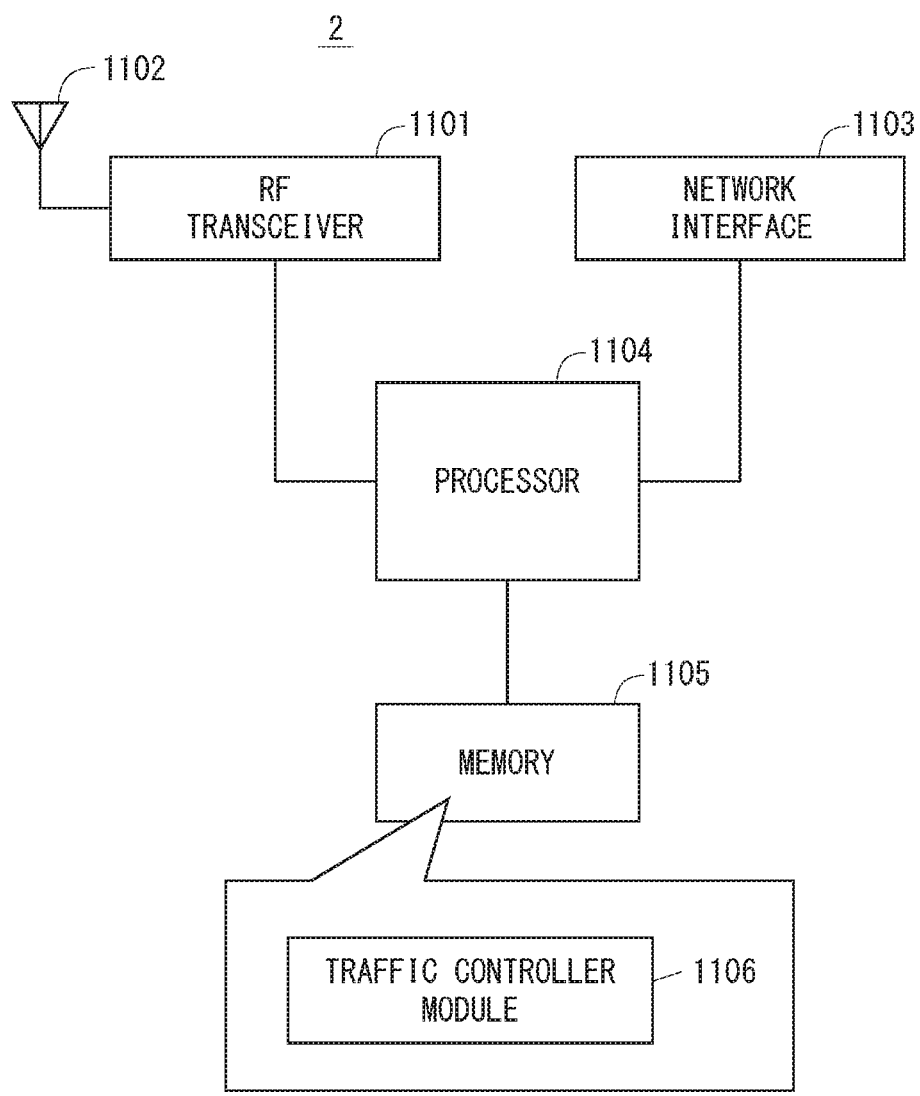
FIG. 11 is a block diagram showing a configuration example of a base station according to some embodiments.

FIG. 11 is a block diagram showing a configuration example of the base station 2 according to the above-described embodiments. Referring to FIG. 11, the base station 2 includes a Radio Frequency (RF) transceiver 1101, a network interface 1103, a processor 1104, and a memory 1105. The RF transceiver 1101 performs analog RF signal processing to communicate with radio terminals 1. The RF transceiver 1101 may include a plurality of transceivers. The RF transceiver 1101 is connected to an antenna 1102 and the processor 1104. The RF transceiver 1101 receives modulated symbol data from the processor 1104, generates a transmission RF signal, and supplies the generated transmission RF signal to the antenna 1102. Further, the RF transceiver 1101 generates a baseband reception signal based on a reception RF signal received by the antenna 1102 and supplies it to the processor 1104.

The network interface 1103 is used to communicate with network node 2 (e.g., the S-GW 41, the MME 43, and the MEC server 601). The network interface 1103 may include, for example, a network interface card (NIC) conforming to the IEEE 802.3 series.

The processor 1104 performs digital baseband signal processing (i.e., data-plane processing) and control-plane processing for radio communication. For example, in the case of Long Term Evolution (LTE), the digital baseband signal processing performed by the processor 1104 may include signal processing of the Packet Data Convergence Protocol (PDCP) layer, Radio Link Control Protocol (RLC) layer, Medium Access Control (MAC) layer, and PHY layer. Besides, the control-plane processing performed by the processor 1104 may include processing of the S1 protocol, Radio Resource Control (RRC) protocol, and MAC Control Elements (CEs).

The processor 1104 may include a plurality of processors. For example, the processor 1104 may include a modem-processor (e.g., DSP) that performs the digital baseband signal processing, and a protocol-stack-processor (e.g., CPU or MPU) that performs the control-plane processing.

The memory 1105 is composed of a combination of a volatile memory and a nonvolatile memory. The volatile memory is, for example, an SRAM, a DRAM, or a combination thereof. The nonvolatile memory is, for example, an MROM, a PROM, a flash memory, a hard disk drive, or any combination thereof. The memory 1105 may include a storage located apart from the processor 1104. In this case, the processor 1104 may access the memory 1105 through the network interface 1103 or an I/O interface (not shown).

The memory 1105 may store software modules (computer programs) including instructions and data to perform processing of the base station 2 described in the above embodiments. In the example of FIG. 11, the memory is used to store software modules including a traffic controller module 1106. The processor 1104 loads these software modules from the memory 1105 and executes them, thereby performing the processing of the base station 2 described in the above-embodiments.

FIG. 12 is a block diagram showing a configuration example of the MEC server 601. Referring to FIG. 12, the MEC server 5 includes hardware components including a network interface 1201, a processor 1202, and a memory (or storage) 1203. The network interface 1201 is used to communicate with the eNodeB 2 and other network nodes. The network interface 1201 may include, for example, a network interface card (NIC) conforming to the IEEE 802.3 series.

The processor 1202 loads software (or computer programs) from the memory 1203 and executes the loaded software, thereby performing the processing of the MEC server 601 described in the above embodiments with reference to the drawings. The processor 1202 may be, for example, a microprocessor, an MPU, or a CPU. The processor 1202 may include a plurality of processors.

The memory 1503 is composed of a combination of a volatile memory and a nonvolatile memory. The memory 1203 may include a plurality of memory devices that are physically independent from one another. The memory 1203 may include a storage located apart from the processor 1202. In this case, the processor 1202 may access the memory 1203 via an I/O interface (not shown).

In the example shown in FIG. 12, the memory 1203 is used to store software modules 1204 to 1207 for MEC, a criteria manager module 1208, and a traffic monitor module 1209. The virtualization management software 1204 is executed by the processor 1202 to virtualize hardware components including the network interface 1201, the processor 1202, and the memory 1203 and provide Infrastructure as a Service (IaaS) or Platform as a Service (PaaS) facilities, thereby providing a hosting environment for applications.

The application platform services software 1205 is executed by the processor 1202 to provide applications with middleware services such as a communication service, a radio network information service, and a traffic offload function.

The application platform services software 1205 may include a virtualized S/P-GW software module 1206. The virtualized S/P-GW software module 1206 uses the hosting environment provided by the virtualization management software 1204, and provides functions of S-GW or P-GW or both.

The one or more applications 1207 are MEC applications hosted on the MEC server 601. The one or more applications 1207 communicate with the UEs 1 using communication services provided by the application platform services software 1205.

The criteria manager module 1208 is executed by the processor 1202 to provide the functions of the criteria manager 6 described in the above embodiments. The traffic monitor module 1209 is executed by the processor 1202 to provide the functions of the traffic monitor 7 described in the above embodiments.

As described above with reference to FIGS. 8 and 12, each of the processors included in the criteria manager 6, the traffic monitor 7, the traffic controller 8, the base station 2, and the MEC server 601 in the above embodiments executes one or more programs including a set of instructions to cause a computer to perform an algorithm described above with reference to the drawings. These programs may be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a Compact Disc Read Only Memory (CD-ROM), CD-R, CD-R/W, and a semiconductor memory (such as a mask ROM, a Programmable ROM (PROM), an Erasable PROM (EPROM), a flash ROM, and a Random Access Memory (RAM)). These programs may be supplied to computers by using various types of transitory computer readable media. Examples of the transitory computer readable media include an electrical signal, an optical signal, and an electromagnetic wave. The transitory computer readable media can be used to supply programs to a computer through a wired communication line (e.g., electric wires and optical fibers) or a wireless communication line.

OTHER EMBODIMENTS

Each of the above embodiments may be used individually, or two or more of the embodiments may be appropriately combined with one another.

Further, the above-described embodiments are merely examples of applications of the technical ideas obtained by the inventors. These technical ideas are not limited to the above-described embodiments and various modifications may be made thereto.

For example, the whole or part of the embodiments disclosed above can be described as, but not limited to, the following supplementary notes.

(Supplementary Note 1)

A traffic controller comprising:

at least one memory; and at least one processor coupled to the at least one memory and configured to:

receive, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;

receive, from a criteria manager, an evaluation criterion for deciding a priority of each packet flow transmitted by at least one wireless terminal;

determine, based on the evaluation criterion, one or more packet flows on which traffic shaping is to be imposed; and in response to the first control message, control a base station within the RAN or a packet transfer node within the mobile backhaul to execute the traffic shaping.

(Supplementary Note 2)

The traffic controller according to Supplementary note 1, wherein the at least one processor is further configured to:

receive, from the traffic monitor, a second control message generated in response to insufficient reduction of the total transmission rate after transmission of the first control message; and in response to the second control message, control the base station or the packet transfer node to increase the number of the one or more packet flows on which the traffic shaping is to be imposed, or to further reduce a transmission rate of at least one of the one or more packet flows.

(Supplementary Note 3)

The traffic controller according to Supplementary note 1 or 2, wherein the at least one processor is further configured to:

receive a third control message from the traffic monitor; and control the base station or the packet transfer node to stop the traffic shaping in response to the third control message.
(Supplementary Note 4)

The traffic controller according to any one of Supplementary notes 1 to 3, wherein the evaluation criterion includes first information indicating a unit for specifying a packet flow to be preferentially transmitted.
(Supplementary Note 5)

The traffic controller according to Supplementary note 4, wherein the first information defines that the packet flow to be preferentially transmitted needs to be specified on a per-base station basis, a per-cell basis, a per-wireless terminal basis, a bearer basis, or a per-service basis.
(Supplementary Note 6)

The traffic controller according to any one of Supplementary notes 1 to 5, wherein the evaluation criterion includes second information for specifying a packet flow to be preferentially transmitted.
(Supplementary Note 7)

The traffic controller according to Supplementary note 6, wherein the second information indicates at least one of: (a) a geographical area; (b) a type of a base station, cell, terminal, wireless terminal, bearer, or service; and (c) an identifier of a base station, cell, terminal, wireless terminal, bearer, or service.
(Supplementary Note 8)

The traffic controller according to any one of Supplementary notes 1 to 7, wherein the at least one processor is configured to determine the one or more packet flows, on which the traffic shaping is to be imposed, on a per-service basis, a per-bearer basis, a per-wireless terminal basis, a per-cell basis, or a per-base station basis.
(Supplementary Note 9)

The traffic controller according to any one of Supplementary notes 1 to 8, wherein the at least one processor is configured to control the base station or the packet transfer node to execute the traffic shaping on a per-service basis, a per-bearer basis, a per-wireless terminal basis, a per-cell basis, or a per-base station basis.
(Supplementary Note 10)

The traffic controller according to any one of Supplementary notes 1 to 9, wherein the external network is a network of a specific mobile virtual network operator (MVNO), and the first control message is generated by the traffic monitor based on a comparison of the total transmission rate at a point of interconnection (POI) between the MNO and the specific MVNO with a threshold in accordance with an agreement between the MNO and the specific MVNO.
(Supplementary Note 11)

The traffic controller according to any one of Supplementary notes 1 to 10, wherein the at least one processor is further configured to request the base station to allocate uplink radio resources according to the traffic shaping.
(Supplementary Note 12)

The traffic controller according to Supplementary note 11, wherein the at least one processor is configured to request the base station to reduce uplink radio resources to be allocated to a wireless terminal that transmits a packet flow the transmission rate of which is reduced by the traffic shaping.
(Supplementary Note 13)

The traffic controller according to Supplementary note 12, wherein the at least one processor is further configured to, after stopping the traffic shaping, request the base station to allocate uplink radio resources, larger than those allocated before starting the traffic shaping, to a wireless terminal that transmits a packet flow the transmission rate of which has been reduced by the traffic shaping.
(Supplementary Note 14)

The traffic controller according to any one of Supplementary notes 11 to 13, wherein the at least one processor is further configured to request the base station to guarantee allocation of uplink radio resources to a wireless terminal that transmits a packet flow the transmission rate of which is guaranteed by the traffic shaping.
(Supplementary Note 15)

The traffic controller according to any one of Supplementary notes 1 to 14, wherein the evaluation criterion relates to a specific geographical area, and the at least one processor is further configured to control the traffic shaping in a manner such that a transmission rate of a packet flow of a first wireless terminal located within the geographical area is higher than a transmission rate of a packet flow of a second wireless terminal located outside the geographical area.
(Supplementary Note 16)

The traffic controller according to any one of Supplementary notes 1 to 15, wherein the traffic controller is arranged in the base station.
(Supplementary Note 17)

The traffic controller according to any one of Supplementary notes 1 to 15, wherein the traffic controller is arranged in a mobile edge computing (MEC) server coupled to the base station.
(Supplementary Note 18)

A traffic monitor comprising:
at least one memory; and
at least one processor coupled to the at least one memory and configured to:
generate a first control message in response to an increase in a total transmission rate of a plurality of packet flows sent through a cellular communication network of a mobile network operator (MNO) from a plurality of wireless terminals to a specific external network; and
transmit the first control message to a traffic controller,
wherein the cellular communication network includes a radio access network (RAN), a core network, a core network and a mobile backhaul configured to connect the RAN and the core network, and
wherein the first control message triggers the traffic controller to execute traffic shaping at a base station within the RAN or at a packet transfer node within the mobile backhaul.
(Supplementary Note 19)

The traffic controller according to Supplementary note 18, wherein the at least one processor is further configured to: generate a second control message in response to insufficient reduction of the total transmission rate after the transmission of the first control message; and transmit the second control message to the traffic controller, wherein the second control message triggers the traffic controller to increase the number of one or more packet flows on which the traffic shaping is to be imposed, or triggers the traffic controller to further reduce a transmission rate of at least one of the one or more packet flows.
(Supplementary Note 20)

The traffic monitor according to Supplementary note 18 or 19, wherein the external network is a network of a specific mobile virtual network operator (MVNO), and the at least one processor is configured to generate the first control message based on a comparison of the total transmission rate at a point of interconnection (POI) between the MNO and the specific MVNO with a threshold in accordance with an agreement between the MNO and the specific MVNO.

(Supplementary Note 21)

A criteria manager comprising:

at least one memory; and at least one processor coupled to the at least one memory and configured to transmit, to a traffic controller, an evaluation criterion for deciding a priority of each packet flow transmitted by at least one wireless terminal, wherein the evaluation criterion is used by the traffic controller to determine one or more packet flows on which traffic shaping at a base station within a radio access network (RAN) or at a packet transfer node within a mobile backhaul is to be imposed.

(Supplementary Note 22)

The criteria manager according to Supplementary note 21, wherein the evaluation criterion includes first information indicating a unit for specifying a packet flow to be preferentially transmitted.

(Supplementary Note 23)

The criteria manager according to Supplementary note 22, wherein the first information defines that the packet flow to be preferentially transmitted needs to be specified on a per-base station basis, a per-cell basis, a per-wireless terminal basis, a bearer basis, or a per-service basis.

(Supplementary Note 24)

The criteria manager according to any one of Supplementary notes 21 to 23, wherein the evaluation criterion includes second information for specifying a packet flow to be preferentially transmitted.

(Supplementary Note 25)

The criteria manager according to Supplementary note 24, wherein the second information indicates at least one of: (a) a geographical area; (b) a type of a base station, cell, terminal, wireless terminal, bearer, or service; and (c) an identifier of a base station, cell, terminal, wireless terminal, bearer, or service.

(Supplementary Note 26)

The criteria manager according to any one of Supplementary notes 21 to 25, wherein the evaluation criterion relates to a specific geographical area, and the evaluation criterion is used by the traffic controller to execute the traffic shaping in a manner such that a transmission rate of a packet flow of a first wireless terminal located within the geographical area is higher than a transmission rate of a packet flow of a second wireless terminal located outside the geographical area.

(Supplementary Note 27)

A system comprising:

a traffic controller according to any one of Supplementary notes 1 to 17;

a traffic monitor according to any one of Supplementary notes 18 to 20; and a criterion manager according to any one of Supplementary notes 21 to 26.

(Supplementary Note 28)

A method performed by a traffic controller, the method comprising:

receiving, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;

receiving, from a criteria manager, an evaluation criterion for deciding a priority of each packet flow transmitted by at least one wireless terminal;

determining, based on the evaluation criterion, one or more packet flows on which traffic shaping is to be imposed; and in response to the first control message, controlling a base station within the RAN or a packet transfer node within the mobile backhaul to execute the traffic shaping.

(Supplementary Note 29)

A method performed by a traffic manager, the method comprising:

generating a first control message in response to an increase in a total transmission rate of a plurality of packet flows sent through a cellular communication network of a mobile network operator (MNO) from a plurality of wireless terminals to a specific external network; and transmitting the first control message to a traffic controller, wherein the cellular communication network includes a radio access network (RAN), a core network, a core network and a mobile backhaul configured to connect the RAN and the core network, and wherein the first control message triggers the traffic controller to execute traffic shaping at a base station within the RAN or at a packet transfer node within the mobile backhaul.

(Supplementary Note 30)

A method performed by a criteria manager, the method comprising:

transmitting, to a traffic controller, an evaluation criterion for deciding a priority of each packet flow transmitted by at least one wireless terminal, wherein the evaluation criterion is used by the traffic controller to determine one or more packet flows on which traffic shaping at a base station within a radio access network (RAN) or at a packet transfer node within a mobile backhaul is to be imposed.

(Supplementary Note 31)

A program for causing a computer to perform a method in a traffic controller, wherein the method comprises:

receiving, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;

receiving, from a criteria manager, an evaluation criterion for deciding a priority of each packet flow transmitted by at least one wireless terminal;

determining, based on the evaluation criterion, one or more packet flows on which traffic shaping is to be imposed; and in response to the first control message, controlling a base station within the RAN or a packet transfer node within the mobile backhaul to execute the traffic shaping.

(Supplementary Note 32)

A program for causing a computer to perform a method in a traffic monitor, wherein the method comprises:

generating a first control message in response to an increase in a total transmission rate of a plurality of packet flows sent through a cellular communication network of a mobile network operator (MNO) from a plurality of wireless terminals to a specific external network; and transmitting the first control message to a traffic controller, wherein the cellular communication network includes a radio access network (RAN), a core network, a core network and a mobile backhaul configured to connect the RAN and the core network, and wherein the first control message triggers the traffic controller to execute traffic shaping at a base station within the RAN or at a packet transfer node within the mobile backhaul.

(Supplementary Note 33)

A program for causing a computer to perform a method in a criteria manager, wherein the method comprises:

transmitting, to a traffic controller, an evaluation criterion for deciding a priority of each packet flow transmitted by at least one wireless terminal, wherein the evaluation criterion is used by the traffic controller to determine one or more packet flows on which traffic shaping at a base station within a radio access network (RAN) or at a packet transfer node within a mobile backhaul is to be imposed.

REFERENCE SIGNS LIST

1 WIRELESS TERMINAL
2 BASE STATION
6 CRITERIA MANAGER
7 TRAFFIC MONITOR
8 TRAFFIC CONTROLLER
20 RADIO ACCESS NETWORK (RAN)
30 MOBILE BACKHAUL
31 ROUTER
40 CORE NETWORK
41 S-GW
42 P-GW
50 EXTERNAL NETWORK
51 APPLICATION SERVER

The invention claimed is:

1. A traffic controller comprising:

at least one memory; and at least one processor coupled to the at least one memory and configured to:

receive, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;

receive, from a criteria manager, an evaluation criterion for deciding a priority of each packet flow transmitted by at least one wireless terminal;

determine, based on the evaluation criterion, one or more packet flows on which traffic shaping is to be imposed; and in response to the first control message, control a base station within the RAN or a packet transfer node within the mobile backhaul to execute the traffic shaping.

2. The traffic controller according to claim 1, wherein the at least one processor is further configured to:

receive, from the traffic monitor, a second control message generated in response to insufficient reduction of the total transmission rate after transmission of the first control message; and in response to the second control message, control the base station or the packet transfer node to increase the number of the one or more packet flows on which the traffic shaping is to be imposed, or to further reduce a transmission rate of at least one of the one or more packet flows.

3. The traffic controller according to claim 1, wherein the at least one processor is further configured to:

receive a third control message from the traffic monitor; and control the base station or the packet transfer node to stop the traffic shaping in response to the third control message.

4. The traffic controller according to claim 1, wherein the evaluation criterion includes first information indicating a unit for specifying a packet flow to be preferentially transmitted.

5. The traffic controller according to claim 4, wherein the first information defines that the packet flow to be preferentially transmitted needs to be specified on a per-base station basis, a per-cell basis, a per-wireless terminal basis, a bearer basis, or a per-service basis.

6. The traffic controller according to claim 1, wherein the evaluation criterion includes second information for specifying a packet flow to be preferentially transmitted.

7. The traffic controller according to claim 6, wherein the second information indicates at least one of: (a) a geographical area; (b) a type of a base station, cell, terminal, wireless terminal, bearer, or service; and (c) an identifier of a base station, cell, terminal, wireless terminal, bearer, or service.

8. The traffic controller according to claim 1, wherein the at least one processor is configured to determine the one or more packet flows, on which the traffic shaping is to be imposed, on a per-service basis, a per-bearer basis, a per-wireless terminal basis, a per-cell basis, or a per-base station basis.

9. The traffic controller according to claim 1, wherein the at least one processor is configured to control the base station or the packet transfer node to execute the traffic shaping on a per-service basis, a per-bearer basis, a per-wireless terminal basis, a per-cell basis, or a per-base station basis.

10. The traffic controller according to claim 1, wherein the external network is a network of a specific mobile virtual network operator (MVNO), and the first control message is generated by the traffic monitor based on a comparison of the total transmission rate at a point of interconnection (POI) between the MNO and the specific MVNO with a threshold in accordance with an agreement between the MNO and the specific MVNO.

11. The traffic controller according to claim 1, wherein the at least one processor is further configured to request the base station to allocate uplink radio resources according to the traffic shaping.

12. The traffic controller according to claim 11, wherein the at least one processor is configured to request the base station to reduce uplink radio resources to be allocated to a wireless terminal that transmits a packet flow the transmission rate of which is reduced by the traffic shaping.

13. The traffic controller according to claim 12, wherein the at least one processor is further configured to, after stopping the traffic shaping, request the base station to allocate uplink radio resources, larger than those allocated before starting the traffic shaping, to a wireless terminal that transmits a packet flow the transmission rate of which has been reduced by the traffic shaping.

14. The traffic controller according to claim 1, wherein the at least one processor is further configured to request the base station to guarantee allocation of uplink radio resources to a wireless terminal that transmits a packet flow the transmission rate of which is guaranteed by the traffic shaping.

15. The traffic controller according to claim 1, wherein
the evaluation criterion relates to a specific geographical area, and
the at least one processor is further configured to control the traffic shaping in a manner such that a transmission rate of a packet flow of a first wireless terminal located within the geographical area is higher than a transmission rate of a packet flow of a second wireless terminal located outside the geographical area.

16. The traffic controller according to claim 1, wherein the traffic controller is arranged in the base station or in a mobile edge computing (MEC) server coupled to the base station.

17. A traffic monitor comprising:
at least one memory; and
at least one processor coupled to the at least one memory and configured to:
generate a first control message in response to an increase in a total transmission rate of a plurality of packet flows sent through a cellular communication network of a mobile network operator (MNO) from a plurality of wireless terminals to a specific external network; and
transmit the first control message to a traffic controller,
wherein the cellular communication network includes a radio access network (RAN), a core network, a core network and a mobile backhaul configured to connect the RAN and the core network, and
wherein the first control message triggers the traffic controller to execute traffic shaping at a base station within the RAN or at a packet transfer node within the mobile backhaul.

18. The traffic controller according to claim 17, wherein the at least one processor is further configured to: generate a second control message in response to insufficient reduction of the total transmission rate after the transmission of the first control message; and transmit the second control message to the traffic controller,
wherein the second control message triggers the traffic controller to increase the number of one or more packet flows on which the traffic shaping is to be imposed, or triggers the traffic controller to further reduce a transmission rate of at least one of the one or more packet flows.

19. The traffic monitor according to claim 17, wherein
the external network is a network of a specific mobile virtual network operator (MVNO), and
the at least one processor is configured to generate the first control message based on a comparison of the total transmission rate at a point of interconnection (POI) between the MNO and the specific MVNO with a threshold in accordance with an agreement between the MNO and the specific MVNO.

20. A method performed by a traffic controller, the method comprising:
receiving, from a traffic monitor, a first control message generated in response to an increase in a total transmission rate of a plurality of packet flows sent through a cellular communication network of a mobile network operator (MNO) from a plurality of wireless terminals to a specific external network, the cellular communication network including a radio access network (RAN), a core network, and a mobile backhaul configured to connect the RAN to the core network;
receiving, from a criteria manager, an evaluation criterion for deciding a priority of each packet flow transmitted by at least one wireless terminal;
determining, based on the evaluation criterion, one or more packet flows on which traffic shaping is to be imposed; and
in response to the first control message, controlling a base station within the RAN or a packet transfer node within the mobile backhaul to execute the traffic shaping.

* * * * *